(12) United States Patent
Zhang et al.

(10) Patent No.: US 10,271,360 B2
(45) Date of Patent: Apr. 23, 2019

(54) COMMUNICATION METHOD, USER EQUIPMENT, AND BASE STATION

(71) Applicant: Huawei Technologies Co., Ltd., Shenzhen (CN)

(72) Inventors: Hongping Zhang, Shanghai (CN); Qinghai Zeng, Shanghai (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/720,286

(22) Filed: Sep. 29, 2017

(65) Prior Publication Data

US 2018/0027524 A1 Jan. 25, 2018

Related U.S. Application Data

(63) Continuation of application No. PCT/CN2015/075475, filed on Mar. 31, 2015.

(51) Int. Cl.
| | |
|---|---|
| *H04W 76/15* | (2018.01) |
| *H04W 36/00* | (2009.01) |
| *H04L 5/00* | (2006.01) |
| *H04W 76/10* | (2018.01) |
| *H04W 28/02* | (2009.01) |

(Continued)

(52) U.S. Cl.
CPC ............ *H04W 76/10* (2018.02); *H04L 5/0053* (2013.01); *H04W 28/0205* (2013.01); *H04W 72/005* (2013.01); *H04W 72/02* (2013.01); *H04W 72/042* (2013.01); *H04W 72/0413* (2013.01); *H04W 74/002* (2013.01); *H04W 76/15* (2018.02); *H04L 5/0035* (2013.01);

(Continued)

(58) Field of Classification Search
None
See application file for complete search history.

(56) References Cited

U.S. PATENT DOCUMENTS

2013/0028069 A1* 1/2013 Pelletier ............ H04W 72/0453 370/216
2013/0223344 A1 8/2013 Sun et al.
(Continued)

FOREIGN PATENT DOCUMENTS

| CN | 102143473 A | 8/2011 |
|---|---|---|
| CN | 104137457 A | 11/2014 |

(Continued)

*Primary Examiner* — Ajit Patel
(74) *Attorney, Agent, or Firm* — Leydig, Voit & Mayer, Ltd.

(57) ABSTRACT

The present invention discloses a communication method, user equipment, and a base station. The method includes: obtaining, by user equipment, first indication information; when the user equipment is in a radio resource control connected mode, determining, by the user equipment based on the first indication information, to add a second cell as a serving cell; sending, by the user equipment to a second base station to which the second cell belongs, a first message used to request to add the second cell as a serving cell of the user equipment; receiving, by the user equipment, a second message used to indicate that the serving cell of the user equipment is successfully added; and communicating, by the user equipment, with a first base station and the second base station by using the first cell and the second cell.

8 Claims, 13 Drawing Sheets

(51) Int. Cl.
*H04W 72/00* (2009.01)
*H04W 72/02* (2009.01)
*H04W 72/04* (2009.01)
*H04W 74/00* (2009.01)
*H04W 92/20* (2009.01)

(52) U.S. Cl.
CPC .... *H04W 36/0069* (2018.08); *H04W 36/0072* (2013.01); *H04W 92/20* (2013.01)

(56) References Cited

U.S. PATENT DOCUMENTS

| | | | |
|---|---|---|---|
| 2014/0192775 A1 | 7/2014 | Li et al. | |
| 2014/0241317 A1* | 8/2014 | Jamadagni | H04L 5/0032 370/331 |
| 2014/0307623 A1 | 10/2014 | Gheorghiu et al. | |
| 2015/0043492 A1 | 2/2015 | Baek et al. | |
| 2015/0215900 A1* | 7/2015 | Jung | H04W 24/10 370/329 |
| 2015/0341838 A1* | 11/2015 | Pinheiro | H04W 52/0251 455/449 |
| 2015/0373559 A1* | 12/2015 | Hong | H04W 16/32 370/329 |
| 2016/0205681 A1* | 7/2016 | Kim | H04B 7/2656 370/329 |
| 2016/0323851 A1* | 11/2016 | Kim | H04L 5/001 |
| 2017/0078931 A1* | 3/2017 | Yoshizawa | H04W 36/0083 |
| 2017/0085452 A1* | 3/2017 | Kato | H04W 76/18 |

FOREIGN PATENT DOCUMENTS

| | | |
|---|---|---|
| WO | 2014109606 A1 | 7/2014 |
| WO | 2014172270 A2 | 10/2014 |

* cited by examiner

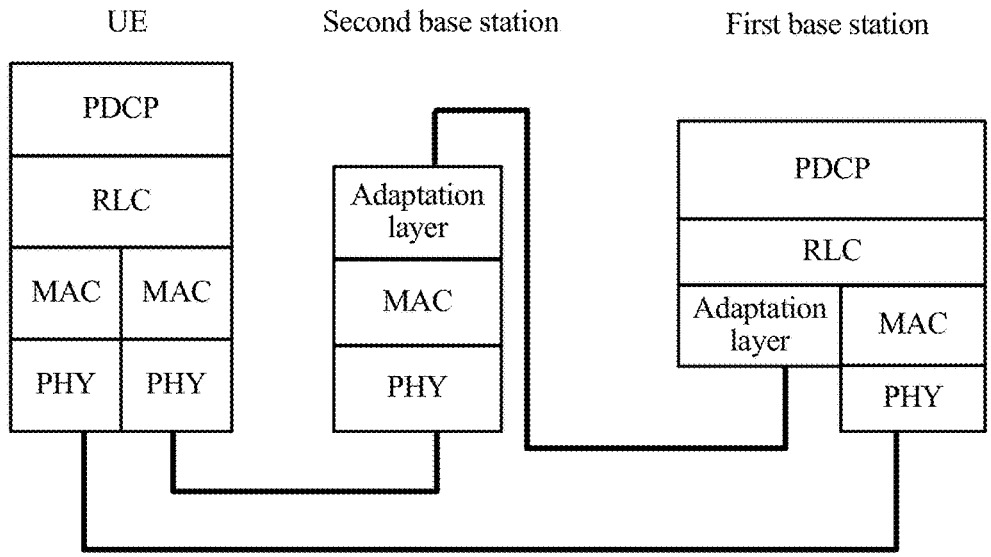

| A second base station receives a first message sent by user equipment, where the first message is used to request to add a second cell of the second base station as a serving cell of the user equipment, the user equipment is in a radio resource control RRC connected mode, a serving base station of the user equipment is a first base station, and a serving cell of the user equipment is a first cell of the first base station | S210 |

| The second base station sends a second message to the user equipment, where the second message is used to indicate that the serving cell of the user equipment is successfully added | S220 |

| The second base station communicates with the user equipment by using the second cell | S230 |

FIG. 12

COMMUNICATION METHOD, USER EQUIPMENT, AND BASE STATION

CROSS-REFERENCE TO RELATED APPLICATIONS

This application is a continuation of International Application No. PCT/CN2015/075475, filed on May 31, 2015, the disclosure of which is hereby incorporated by reference in its entirety.

TECHNICAL FIELD

Embodiments of the present invention relate to the communications field, and in particular, to a communication method, user equipment, and a base station in the communications field.

BACKGROUND

With rapid development of a mobile communications system, the mobile communications system can provide increasingly high quality of service. To maintain a long-term competitive advantage of the 3rd Generation Partnership Project (the 3rd Generation Partner Project, "3GPP" for short) and further improve spectral efficiency and a user throughput of the mobile communications system, a carrier aggregation (Carrier Aggregation, "CA" for short) technology is introduced to the Long Term Evolution Advanced (LTE-Advanced, "LTE-A" for short) standard as a new technology. In the carrier aggregation technology, user equipment (User Equipment, "UE" for short) can simultaneously use multiple cells to perform uplink-downlink communication, to support high-speed data transmission. In the multiple cells, one cell is a primary cell (Primary Cell, "PCell" for short), and the other cells are secondary cells (Secondary Cell, "SCell" for short).

In a Long Term Evolution (Long Term Evolution, "LTE" for short) system, carrier aggregation may be classified into intra-base station cell aggregation, inter-base station cell aggregation, and the like. The intra-base station cell aggregation means: For one UE, all aggregated serving cells belong to a same base station. Because the aggregated serving cells are controlled by only one base station, the intra-base station cell aggregation is relatively simple. The inter-base station cell aggregation, also referred to as dual connectivity (Dual Connectivity, "DC" for short), is introduced to the Release-12 (Release-12) that is being developed. The DC supports carrier aggregation for multiple cells of two base stations, and therefore, a user can have better user experience. In the inter-base station cell aggregation technology, for one UE, one base station is a master eNodeB (Master eNB, "MeNB" for short), and the other base stations are secondary eNodeBs (Secondary eNB, "SeNB" for short). The master eNodeB bears more control functions and is generally a macro base station, and a secondary eNodeB is generally a micro base station.

Popularization of smartphones is accompanied with stricter user traffic requirements. Densely deploying micro base stations is an effective method for meeting the stricter user traffic requirements, and is also a future trend. However, in a current communications system, a master eNodeB performs centralized management control on a cell, that is, the master eNodeB delivers a command to control whether to add a secondary cell, or control to add which secondary cell. Specifically, the master eNodeB delivers measurement configuration to UE. The UE reports a measurement report according to the measurement configuration. Then, according to the measurement report, the master eNodeB determines whether to add a secondary cell, or determines to add which secondary cell. Consequently, as cells increase, so does a large quantity of system signaling. Therefore, the base station may be overloaded and cannot process a large quantity of signaling.

SUMMARY

In view of this, embodiments of the present invention provide a data transmission method, user equipment, and a base station, so as to resolve an overload problem of the base station.

According to a first aspect, a communication method is provided, and the communication method includes: obtaining, by user equipment, first indication information, so that the user equipment determines, according to the first indication information, whether a serving cell can be added; when the user equipment is in a radio resource control RRC connected mode, determining, by the user equipment based on the first indication information, to add a second cell as a serving cell, where a serving base station of the user equipment is a first base station, and a serving cell of the user equipment is a first cell of the first base station; sending, by the user equipment, a first message to a second base station to which the second cell belongs, where the first message is used to request to add the second cell as a serving cell of the user equipment; receiving, by the user equipment, a second message sent by the second base station or the first base station, where the second message is used to indicate that the serving cell of the user equipment is successfully added; and communicating, by the user equipment, with the first base station and the second base station by using the first cell and the second cell.

With reference to the first aspect, in a first possible implementation of the first aspect, the first indication information is used to indicate whether adding a serving cell for the user equipment is allowed; and the determining, by the user equipment based on the first indication information, to add a second cell as a serving cell includes: when the first indication information indicates that adding a serving cell for the user equipment is allowed, determining, by the user equipment, to add the second cell as a serving cell.

With reference to the first aspect, in a second possible implementation of the first aspect, the first indication information includes a cell frequency set, and the determining, by the user equipment based on the first indication information, to add a second cell as a serving cell specifically includes: when a frequency of the second cell belongs to the cell frequency set, determining, by the user equipment, to add the second cell as a serving cell; or the first indication information includes a cell frequency and physical cell identifier PCI set, and the determining, by the user equipment based on the first indication information, to add a second cell as a serving cell specifically includes: when a frequency and a PCI of the second cell belong to the cell frequency and PCI set, determining, by the user equipment, to add the second cell as a serving cell.

With reference to the first aspect, or the first or the second possible implementation of the first aspect, in a third possible implementation of the first aspect, the communication method further includes: receiving, by the user equipment, second indication information sent by the second base station, where the second indication information is used to indicate a first cell set; and the determining, by the user equipment based on the first indication information, to add a second cell as a serving cell includes: when the first cell belongs to the first cell set, determining, by the user equipment based on the first indication information, to add the second cell as a serving cell.

With reference to the first aspect, or the first to the third possible implementations of the first aspect, in a fourth possible implementation of the first aspect, the first indication information includes trigger condition information about adding a serving cell.

With reference to any one of the first aspect, or the first to the fourth possible implementations of the first aspect, in a fifth possible implementation of the first aspect, the communication method further includes: receiving, by the user equipment, third indication information sent by the second base station, where the third indication information is used to indicate whether the second cell belongs to a licensed-assisted access LAA cell, and/or is used to indicate correlated-cell information of the second cell; and the determining, by the user equipment based on the first indication information, to add a second cell as a serving cell includes: when determining that the second cell belongs to the LAA cell and/or the first cell is a correlated cell of the second cell, determining, by the user equipment based on the first indication information, to add the second cell as a serving cell.

With reference to the first aspect, in a sixth possible implementation of the first aspect, the first base station and the second base station are a same base station, the first indication information is used to indicate a second cell set, and a cell included in the second cell set is a cell of the first base station; and the determining, by the user equipment based on the first indication information, to add a second cell as a serving cell includes: when the second cell belongs to the second cell set, determining, by the user equipment, to add the second cell as a serving cell.

With reference to any one of the first aspect, or the first to the sixth possible implementations of the first aspect, in a seventh possible implementation of the first aspect, the first message includes at least one of the following information: cell identifier information of the first cell, identifier information of the user equipment, or first authentication information used to perform authentication on the user equipment.

With reference to any one of the first aspect, or the first to the seventh possible implementations of the first aspect, in an eighth possible implementation of the first aspect, the second message includes second authentication information used to perform authentication on a network; and the communicating, by the user equipment, with the first base station and the second base station by using the first cell and the second cell includes: after succeeding in authentication that is based on the second authentication information, communicating, by the user equipment, with the first base station and the second base station by using the first cell and the second cell.

According to a second aspect, a communication method is provided, and the communication method includes: receiving, by a second base station, a first message sent by user equipment, where the first message is used to request to add a second cell of the second base station as a serving cell of the user equipment, the user equipment is in a radio resource control RRC connected mode, a serving base station of the user equipment is a first base station, and a serving cell of the user equipment is a first cell of the first base station; sending, by the second base station, a second message to the user equipment, where the second message is used to indicate that the serving cell of the user equipment is successfully added; and communicating, by the second base station, with the user equipment by using the second cell.

With reference to the second aspect, in a first possible implementation of the second aspect, the communication method further includes: sending, by the second base station, a third message to the first base station according to the first message, where the third message is used to request the first base station to add a transmission path for the user equipment; and receiving, by the second base station, a fourth message sent by the first base station according to the third message, where the fourth message is used to indicate that the transmission path of the user equipment is successfully added.

With reference to the second aspect or the first possible implementation of the second aspect, in a second possible implementation of the second aspect, the communication method further includes: sending, by the second base station, second indication information to the user equipment, where the second indication information is used to indicate a first cell set; and the receiving, by a second base station, a first message sent by user equipment includes: when the user equipment determines, according to the second indication information, that the first cell belongs to the first cell set, receiving, by the second base station, the first message sent by the user equipment.

With reference to the second aspect, or the first or the second possible implementation of the second aspect, in a third possible implementation of the second aspect, the communication method further includes: sending, by the second base station, third indication information to the user equipment, where the third indication information is used to indicate whether the second cell belongs to a licensed-assisted access LAA cell, and/or is used to indicate correlated-cell information of the second cell; and the receiving, by a second base station, a first message sent by user equipment includes: when the user equipment determines that the second cell belongs to the LAA cell and/or the first cell is a correlated cell of the second cell, receiving, by the second base station, the first message sent by the user equipment.

With reference to any one of the first to the third possible implementations of the second aspect, in a fourth possible implementation of the second aspect, the fourth message includes bearer information of the user equipment, and the bearer information of the user equipment includes at least one of the following information: bearer identifier information of the user equipment, bearer quality of service QoS information of the user equipment, or uplink GPRS Tunneling Protocol GTP tunnel address information of the user equipment.

With reference to any one of the second aspect, or the first to the fourth possible implementations of the second aspect, in a fifth possible implementation of the second aspect, the communication method further includes: sending, by the second base station, a fifth message to the first base station, where the fifth message includes downlink GTP tunnel address information of the user equipment.

With reference to any one of the second aspect, or the first to the fifth possible implementations of the second aspect, in a sixth possible implementation of the second aspect, the fourth message and the second message include second authentication information used to perform authentication on a network; and the communicating, by the second base station, with the user equipment by using the second cell specifically includes: after the user equipment succeeds in authentication that is based on the second authentication information, communicating, by the second base station, with the user equipment by using the second cell.

With reference to any one of the second aspect, or the first to the sixth possible implementations of the second aspect, in a seventh possible implementation of the second aspect, the first message includes at least one of the following information: cell identifier information of the first cell, identifier information of the user equipment, or first authentication information used to perform authentication on the user equipment; and the third message includes the identifier information of the user equipment and/or the first authentication information.

According to a third aspect, a communication method is provided, and the communication method includes: sending, by a first base station, first indication information to user equipment, so that the user equipment determines, according to the first indication information, whether a serving cell can be added; when the user equipment determines, according to the first indication information, to add a serving cell, receiving, by the first base station, a third message sent by a second base station, where the third message is used to request the first base station to add a transmission path for the user equipment, and the third message includes identifier information of the user equipment; identifying, by the first base station, the user equipment according to the identifier information of the user equipment when the user equipment is in a radio resource control RRC connected mode, where a serving base station of the user equipment is the first base station, and a serving cell of the user equipment is a first cell of the first base station; and sending, by the first base station, a fourth message to the second base station, where the fourth message is used to indicate that the transmission path of the user equipment is successfully added.

With reference to the third aspect, in a first possible implementation of the third aspect, the communication method further includes: sending, by the first base station, a second message to the user equipment when the user equipment requests, according to the first indication information, to add a second cell as a serving cell, where the second message is used to indicate that the second cell is successfully added as a serving cell of the user equipment.

With reference to the third aspect or the first possible implementation of the third aspect, in a second possible implementation of the third aspect, the communication method further includes: receiving, by the first base station, a fifth message sent by the second base station, where the fifth message includes downlink GTP tunnel address information of the user equipment.

With reference to the third aspect, or the first or the second possible implementation of the third aspect, in a third possible implementation of the third aspect, the first indication information is used to indicate whether adding a serving cell for the user equipment is allowed; or the first indication information includes a cell frequency set; or the first indication information includes a cell frequency and physical cell identifier PCI set; or the first indication information includes trigger condition information about adding a serving cell.

With reference to any one of the third aspect, or the first to the third possible implementations of the third aspect, in a fourth possible implementation of the third aspect, the fourth message includes bearer information of the user equipment, and the bearer information of the user equipment includes at least one of the following information: bearer identifier information of the user equipment, bearer quality of service QoS information of the user equipment, or uplink GPRS Tunneling Protocol GTP tunnel address information of the user equipment.

According to a fourth aspect, user equipment is provided, and the user equipment includes: an obtaining module, configured to obtain first indication information, so that the user equipment determines, according to the first indication information, whether a serving cell can be added; a determining module, configured to: when the user equipment is in a radio resource control RRC connected mode, determine, based on the first indication information, to add a second cell as a serving cell, where a serving base station of the user equipment is a first base station, and a serving cell of the user equipment is a first cell of the first base station; a sending module, configured to send a first message to a second base station to which the second cell belongs, where the first message is used to request to add the second cell as a serving cell of the user equipment; a receiving module, configured to receive a second message sent by the second base station or the first base station, where the second message is used to indicate that the serving cell of the user equipment is successfully added; and a communications module, configured to communicate with the first base station and the second base station by using the first cell and the second cell.

With reference to the fourth aspect, in a first possible implementation of the fourth aspect, the first indication information obtained by the obtaining module is used to indicate whether adding a serving cell for the user equipment is allowed; and the determining module is specifically configured to: when the first indication information indicates that adding a serving cell for the user equipment is allowed, determine to add the second cell as a serving cell.

With reference to the fourth aspect, in a second possible implementation of the fourth aspect, the first indication information obtained by the obtaining module includes a cell frequency set, and the determining module is specifically configured to: when a frequency of the second cell belongs to the cell frequency set, determine to add the second cell as a serving cell; or the first indication information obtained by the obtaining module includes a cell frequency and physical cell identifier PCI set, and the determining module is specifically configured to: when a frequency and a PCI of the second cell belong to the cell frequency and PCI set, determine to add the second cell as a serving cell.

With reference to the fourth aspect, or the first or the second possible implementation of the fourth aspect, in a third possible implementation of the fourth aspect, the receiving module is further configured to receive second indication information sent by the second base station, and the second indication information is used to indicate a first cell set; and the determining module is specifically configured to: when the first cell belongs to the first cell set, determine, based on the first indication information, to add the second cell as a serving cell.

With reference to any one of the fourth aspect, or the first to the third possible implementations of the fourth aspect, in a fourth possible implementation of the fourth aspect, the first indication information obtained by the obtaining module includes trigger condition information about adding a serving cell.

With reference to any one of the fourth aspect, or the first to the fourth possible implementations of the fourth aspect, in a fifth possible implementation of the fourth aspect, the receiving module is further configured to receive third indication information sent by the second base station, and the third indication information is used to indicate whether the second cell belongs to a licensed-assisted access LAA cell, and/or is used to indicate correlated-cell information of the second cell; and the determining module is specifically configured to: when it is determined that the second cell belongs to the LAA cell and/or the first cell is a correlated cell of the second cell, determine, based on the first indication information, to add the second cell as a serving cell.

With reference to the fourth aspect, in a sixth possible implementation of the fourth aspect, when the first base station and the second base station are a same base station, the first indication information is used to indicate a second cell set, and a cell included in the second cell set is a cell of the first base station, the determining module is specifically configured to: when the second cell belongs to the second cell set, determine to add the second cell as a serving cell.

With reference to any one of the fourth aspect, or the first to the sixth possible implementations of the fourth aspect, in a seventh possible implementation of the fourth aspect, the first message sent by the sending module includes at least one of the following information: cell identifier information of the first cell, identifier information of the user equipment, or first authentication information used to perform authentication on the user equipment.

With reference to any one of the fourth aspect, or the first to the seventh possible implementations of the fourth aspect, in an eighth possible implementation of the fourth aspect, the second message received by the receiving module includes second authentication information used to perform authentication on a network; and the communications module is specifically configured to: after authentication that is based on the second authentication information succeeds, communicate with the first base station and the second base station by using the first cell and the second cell.

According to a fifth aspect, a base station is provided, and the base station includes: a receiving module, configured to receive a first message sent by user equipment, where the first message is used to request to add a second cell of the base station as a serving cell of the user equipment, the user equipment is in a radio resource control RRC connected mode, a serving base station of the user equipment is a first base station, and a serving cell of the user equipment is a first cell of the first base station; a sending module, configured to send a second message to the user equipment, where the second message is used to indicate that the serving cell of the user equipment is successfully added; and a communications module, configured to communicate with the user equipment by using the second cell.

With reference to the fifth aspect, in a first possible implementation of the fifth aspect, the sending module is further configured to send a third message to the first base station according to the first message, and the third message is used to request the first base station to add a transmission path for the user equipment; and the receiving module is further configured to receive a fourth message sent by the first base station according to the third message, and the fourth message is used to indicate that the transmission path of the user equipment is successfully added.

With reference to the fifth aspect or the first possible implementation of the fifth aspect, in a second possible implementation of the fifth aspect, the sending module is further configured to send second indication information to the user equipment, and the second indication information is used to indicate a first cell set; and the receiving module is specifically configured to: when the user equipment determines, according to the second indication information, that the first cell belongs to the first cell set, receive the first message sent by the user equipment.

With reference to the fifth aspect, or the first or the second possible implementation of the fifth aspect, in a third possible implementation of the fifth aspect, the sending module is further configured to send third indication information to the user equipment, and the third indication information is used to indicate whether the second cell belongs to a licensed-assisted access LAA cell, and/or is used to indicate correlated-cell information of the second cell; and the receiving module is specifically configured to: when the user equipment determines that the second cell belongs to the LAA cell and/or the first cell is a correlated cell of the second cell, receive the first message sent by the user equipment.

With reference to any one of the first to the third possible implementations of the fifth aspect, in a fourth possible implementation of the fifth aspect, the fourth message received by the receiving module includes bearer information of the user equipment, and the bearer information of the user equipment includes at least one of the following information: bearer identifier information of the user equipment, bearer quality of service QoS information of the user equipment, or uplink GPRS Tunneling Protocol GTP tunnel address information of the user equipment.

With reference to any one of the fifth aspect, or the first to the fourth possible implementations of the fifth aspect, in a fifth possible implementation of the fifth aspect, the sending module is further configured to send a fifth message to the first base station, and the fifth message includes downlink GTP tunnel address information of the user equipment.

With reference to any one of the fifth aspect, or the first to the fifth possible implementations of the fifth aspect, in a sixth possible implementation of the fifth aspect, the fourth message received by the receiving module and the second message sent by the sending module include second authentication information used to perform authentication on a network, and the communications module is specifically configured to: after the user equipment succeeds in authentication that is based on the second authentication information, communicate with the user equipment by using the second cell.

With reference to any one of the fifth aspect, or the first to the sixth possible implementations of the fifth aspect, in a seventh possible implementation of the fifth aspect, the first message received by the receiving module includes at least one of the following information: cell identifier information of the first cell, identifier information of the user equipment, or first authentication information used to perform authentication on the user equipment; and the third message sent by the sending module includes the identifier information of the user equipment and/or the first authentication information.

According to a sixth aspect, a base station is provided, and the base station includes: a sending module, configured to send first indication information to user equipment, so that the user equipment determines, according to the first indication information, whether a serving cell can be added; a receiving module, configured to: when the user equipment determines, according to the first indication information, to add a serving cell, receive a third message sent by a second base station, where the third message is used to request the base station to add a transmission path for the user equipment, and the third message includes identifier information of the user equipment; and an identification module, configured to identify the user equipment according to the identifier information of the user equipment when the user equipment is in a radio resource control RRC connected mode, where a serving base station of the user equipment is the base station, and a serving cell of the user equipment is a first cell of the base station, where the sending module is further configured to send a fourth message to the second base station, and the fourth message is used to indicate that the transmission path of the user equipment is successfully added.

With reference to the sixth aspect, in a first possible implementation of the sixth aspect, the sending module is further configured to send a second message to the user equipment when the user equipment requests, according to the first indication information, to add a second cell as a serving cell, and the second message is used to indicate that the second cell is successfully added as a serving cell of the user equipment.

With reference to the sixth aspect or the first possible implementation of the sixth aspect, in a second possible implementation of the sixth aspect, the receiving module is further configured to receive a fifth message sent by the second base station, and the fifth message includes downlink GTP tunnel address information of the user equipment.

With reference to the sixth aspect, or the first or the second possible implementation of the sixth aspect, in a third possible implementation of the sixth aspect, the first indication information sent by the sending module is used to indicate whether adding a serving cell for the user equipment is allowed; or the first indication information sent by the sending module includes a cell frequency set; or the first indication information sent by the sending module includes a cell frequency and physical cell identifier PCI set; or the first indication information sent by the sending module includes trigger condition information about adding a serving cell.

With reference to any one of the sixth aspect, or the first to the third possible implementations of the sixth aspect, in a fourth possible implementation of the sixth aspect, the fourth message sent by the sending module includes bearer information of the user equipment, and the bearer information of the user equipment includes at least one of the following information: bearer identifier information of the user equipment, bearer quality of service QoS information of the user equipment, or uplink GPRS Tunneling Protocol GTP tunnel address information of the user equipment.

Based on the foregoing technical solutions, according to the communication method, the user equipment, and the base station in the embodiments of the present invention, user equipment obtains first indication information, determines, based on the first indication information, to add a second cell as a serving cell, and sends a first message to a second base station to which the second cell belongs, and the first message is used to request to add the second cell as a serving cell of the user equipment, so that after receiving a second message used to indicate that the serving cell of the user equipment is successfully added, the user equipment can perform data transmission with the first base station and the second base station by using the first cell and the second cell. Therefore, the user equipment can autonomously add a cell as a serving cell, and the base station can be prevented from performing centralized management on the serving cell of the user equipment, so that processing load of the base station can be alleviated, and system signaling overheads can be reduced.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 11A to 11D are schematic block diagrams of user plane protocol stacks according to an embodiment of the present invention;

FIG. 12 is a schematic flowchart of a communication method according to another embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems such as a Global System for Mobile Communications (Global System of Mobile communication, "GSM" for short), a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, an LTE frequency division duplex (Frequency Division Duplex, "FDD" for short) system, LTE time division duplex (Time Division Duplex, "TDD" for short), a Universal Mobile Telecommunications System (Universal Mobile Telecommunication System, "UMTS" for short), or a Worldwide Interoperability for Microwave Access (Worldwide Interoperability for Microwave Access, "WiMAX" for short) communications system.

It should also be understood that in the embodiments of the present invention, user equipment (User Equipment, "UE" for short) may be referred to as a terminal (Terminal), a mobile station (Mobile Station, "MS" for short), a mobile terminal (Mobile Terminal), or the like. The user equipment may communicate with one or more core networks by using a radio access network (Radio Access Network, "RAN" for short). For example, the user equipment may be a mobile phone (or referred to as a "cellular" phone) or a computer with a mobile terminal. For example, the user equipment may be a portable, pocket-sized, handheld, computer built-in, or in-vehicle mobile apparatus. The user equipment exchanges voice and/or data with the radio access network.

In the embodiments of the present invention, a base station may be a base transceiver station (Base Transceiver Station, "BTS" for short) in GSM or CDMA, or may be a NodeB (NodeB, "NB" for short) in WCDMA, or may be an evolved NodeB (Evolved Node B, "eNB" or "e-NodeB" for short) in LTE. This is not limited in the present invention. However, for ease of description, the following embodiments provide descriptions by using an eNB as an example.

Figure 1:
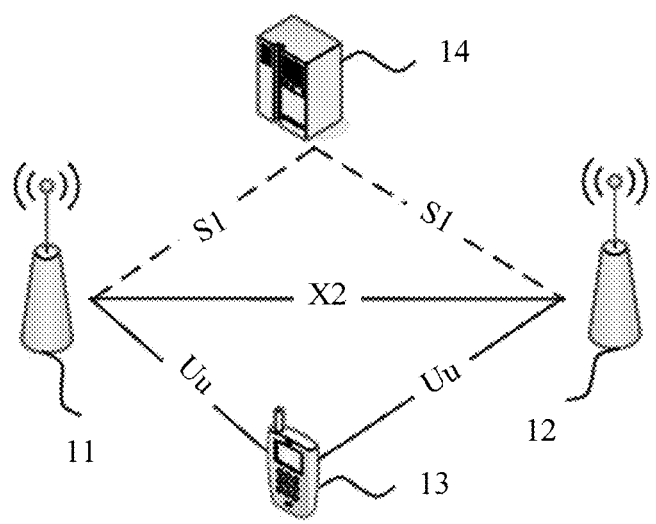
FIG. 1 is a schematic diagram of an LTE system to which an embodiment of the present invention is applied.

FIG. 1 shows a schematic diagram of an LTE system to which an embodiment of the present invention is applied. As shown in FIG. 1, in the LTE system, a base station 11 and a base station 12 are responsible for radio resource management of a radio interface, connection control, cell management and scheduling, and the like. The base station 11 and the base station 12 may perform a communication connection by using an X2 interface, and may separately perform a communication connection to a mobility management entity (Mobility Management Entity, "MME" for short)/serving gateway (Serving GateWay, "SGW" for short) 14 by using an S1 interface. In addition, the base station 11 and the base station 12 may further separately perform a communication connection to UE 13 by using a Uu interface.

It should be understood that the LTE system is used only as an example for description in this embodiment of the present invention. However, this is not limited in the present invention. A technical solution according to this embodiment of the present invention may be applied to another communications system such as an LTE-A system. It should be further understood that only one UE and two base stations are used as examples for description in the LTE system shown in FIG. 1. However, the LTE system may further include more UEs and base stations.

Figure 2:
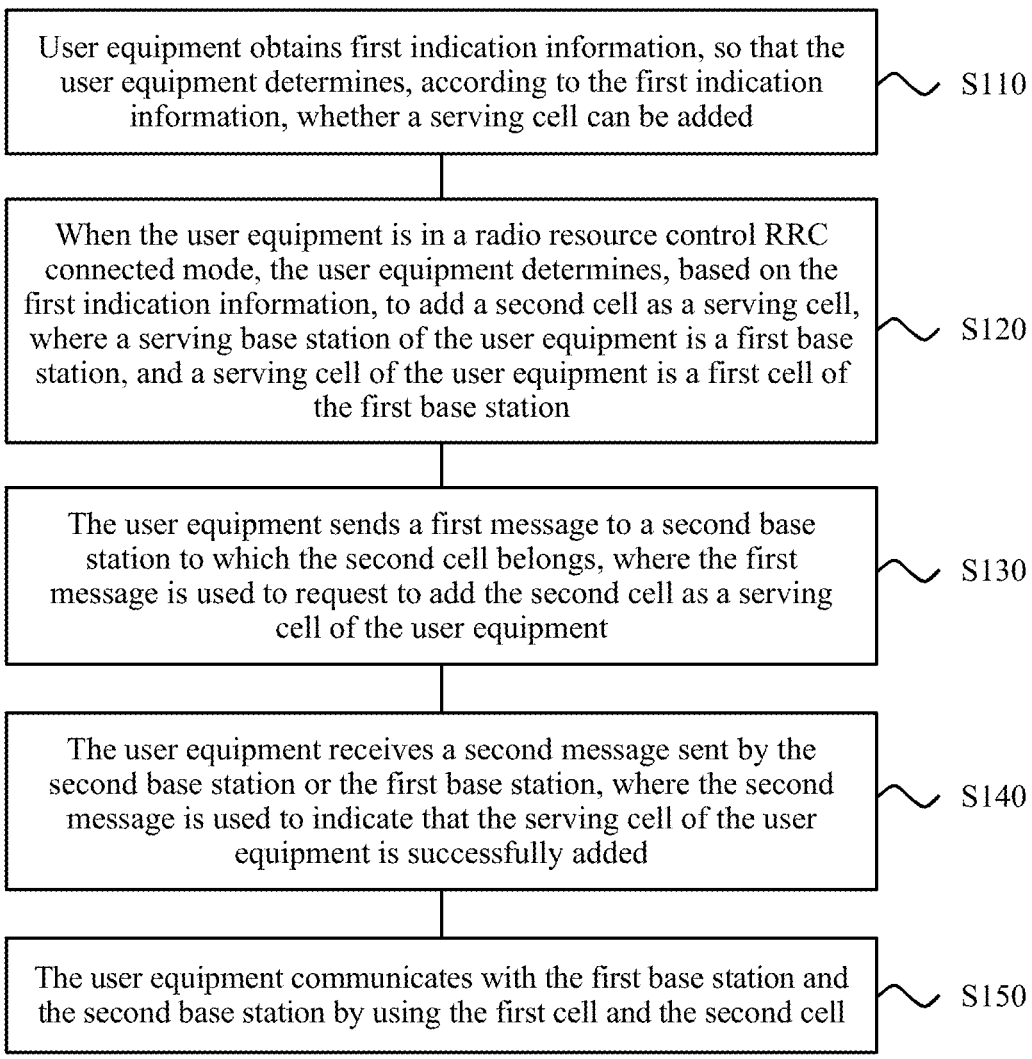
FIG. 2 is a schematic flowchart of a communication method according to an embodiment of the present invention.

FIG. 2 shows a schematic flowchart of a communication method 100 according to an embodiment of the present invention. The method 100 may be executed by user equipment. For example, the user equipment is a mobile phone. As shown in FIG. 2, the communication method 100 includes the following steps.

S110. The user equipment obtains first indication information, so that the user equipment determines, according to the first indication information, whether a serving cell can be added.

S120. When the user equipment is in a radio resource control (Radio Resource Control, "RRC" for short) connected mode, the user equipment determines, based on the first indication information, to add a second cell as a serving cell, where a serving base station of the user equipment is a first base station, and a serving cell of the user equipment is a first cell of the first base station.

S130. The user equipment sends a first message to a second base station to which the second cell belongs, where the first message is used to request to add the second cell as a serving cell of the user equipment.

S140. The user equipment receives a second message sent by the second base station or the first base station, where the second message is used to indicate that the serving cell of the user equipment is successfully added.

S150. The user equipment communicates with the first base station and the second base station by using the first cell and the second cell.

That is, when the UE is in an RRC connected mode, if a current serving base station of the UE is the first base station, and a current serving cell of the UE is the first cell of the first base station, the UE may determine, based on the obtained first indication information, to add the detected second cell as a serving cell of the UE. In this case, the UE may send the first message to the second base station to which the second cell belongs, so as to request the second base station to add the second cell as a serving cell of the user equipment. After the UE receives the second message that is sent by the first base station or the second base station and that is used to indicate that the serving cell of the user equipment is successfully added, the UE may communicate with the first base station and the second base station by using the first cell and the second cell.

Therefore, according to the communication method in this embodiment of the present invention, user equipment obtains first indication information, determines, based on the first indication information, to add a second cell as a serving cell, and sends a first message to a second base station to which the second cell belongs, and the first message is used to request to add the second cell as a serving cell of the user equipment, so that after receiving a second message used to indicate that the serving cell of the user equipment is successfully added, the user equipment can perform data transmission with the first base station and the second base station by using the first cell and the second cell. Therefore, the user equipment can autonomously add a cell as a serving cell, and the base station can be prevented from performing centralized management on the serving cell of the user equipment, so that processing load of the base station can be alleviated, and system signaling overheads can be reduced.

In S110, the user equipment may obtain the first indication information when the user equipment is in an idle (IDLE) mode or a connected mode, so that the user equipment determines, according to the first indication information, whether a serving cell can be added. The first indication information may be information that is from a network device and that is used to indicate whether adding a serving cell for the UE is allowed, for example, indication information from the first base station or the second base station, or may be assistance information or the like, which is obtained by the user equipment, for autonomously determining whether a serving cell can be added. Details are as follows.

Specifically, in this embodiment of the present invention, the user equipment may obtain the first indication information from the first base station. For example, the user equipment may obtain, by receiving a system message broadcast by the first base station in the first cell, the first indication information included in the system message. Alternatively, the user equipment may obtain, by receiving an RRC message sent by the first base station, the first indication information included in the RRC message.

That is, in this embodiment of the present invention, optionally, that the user equipment obtains first indication information includes:

receiving, by the user equipment, a system message or an RRC message of the first cell that is sent by the first base station; and obtaining the first indication information included in the system message or the RRC message.

It should be understood that, in this embodiment of the present invention, when the first base station sends the first indication information to the UE in a form of a system message, the first base station may send first indication information with same content to all UEs in the first cell, so as to further reduce signaling overheads. However, when the first base station sends the first indication information to the UE in a form of an RRC message, the first base station may send first indication information with different content to different UEs in the first cell, so as to deliver an instruction to the UE more flexibly.

It should be further understood that this is used only as an example for description in this embodiment of the present invention. However, this is not limited in the present invention. For example, the user equipment may obtain the first indication information from another network device. For another example, the user equipment may obtain the first indication information according to information configured by a user. For still another example, the user equipment may receive, from the first base station, the first indication information transmitted by the first base station in another form.

In this embodiment of the present invention, the user equipment may determine, according to the obtained first indication information, whether a serving cell can be added. The first indication information may include information used to indicate whether adding a serving cell is allowed, may also include condition information about allowing adding a serving cell, and may further include various types of assistance information, so that according to the assistance information, the user equipment autonomously determines whether a serving cell can be added, or determines a condition for adding a serving cell. The following separately describes the foregoing aspects.

For example, in this embodiment of the present invention, the first indication information may indicate only whether the UE is allowed to autonomously add a serving cell. For another example, the first indication information may indicate that the UE is allowed to autonomously add a cell at which frequency as a serving cell. For still another example, the first indication information may indicate that the UE is allowed to autonomously add which cell at which frequency as a transmission path. It should be further understood that, in this embodiment of the present invention, the first indication information may indicate that the UE is not allowed to autonomously add a cell at which frequency as a serving cell. For yet another example, the first indication information may indicate that the UE is not allowed to autonomously add which cell at which frequency as a transmission path, so as to indirectly indicate that the UE is allowed to autonomously add which cell as a transmission path. For brevity, details are not described herein.

In this embodiment of the present invention, optionally, the first indication information includes a cell frequency set, and adding a cell whose frequency belongs to the cell frequency set as a serving cell is allowed. Optionally, the first indication information includes a cell frequency and physical cell identifier (Physical Cell Identity, "PCI" for short) set, and adding a cell whose frequency and PCI belong to the cell frequency and PCI set as a serving cell is allowed.

In this embodiment of the present invention, optionally, the first indication information includes at least one of the following information: trigger condition information about adding a serving cell, first candidate cell information used to indicate a first candidate cell, second candidate cell information used to indicate a second candidate cell, configuration information of the first candidate cell, or configuration information of the second candidate cell. A base station to which the second candidate cell belongs has a context of the user equipment.

Specifically, for example, the trigger condition information may include a minimum threshold of signal strength of a current serving cell of the UE. When signal strength of the first cell is less than the minimum threshold, the UE may determine to add a serving cell. For another example, the trigger condition information may include a signal strength threshold of a to-be-added serving cell. The UE can consider adding the second cell as a serving cell only when signal strength of the second cell is equal to or greater than the signal strength threshold.

It should be understood that the first candidate cell may be associated with a trigger condition for adding a serving cell for the UE. For example, when the UE detects the second cell, and the UE may determine, according to the first candidate cell information or the configuration information of the first candidate cell, that the second cell belongs to the first candidate cell, the UE may determine that a serving cell can be added. The second candidate cell may include a cell that belongs to a base station having the context of the user equipment. For example, when the second cell detected by the UE belongs to the second candidate cell, it means that the first base station prepares context information of the UE in advance on the second base station to which the second cell belongs, so as to reduce a delay in adding a serving cell. Therefore, the UE may preferentially consider adding a cell in the second candidate cell as a serving cell, so as to further improve user experience.

It should be understood that the foregoing example is used only as an example for description in this embodiment of the present invention. However, this is not limited in the present invention. The first indication information according to this embodiment of the present invention may include other content. For example, the first indication information may include other information provided that according to the first indication information, the user equipment can determine whether a serving cell can be added, or can determine to add which serving cell. For example, the first indication information may include information such as cell signal strength.

In S120, when the user equipment is in a radio resource control RRC connected mode, the user equipment determines, based on the first indication information, to add the second cell as a serving cell. The serving base station of the user equipment is the first base station, and the serving cell of the user equipment is the first cell of the first base station. Details are described in the following with reference to FIG. 3 to FIG. 8.

Figure 3:
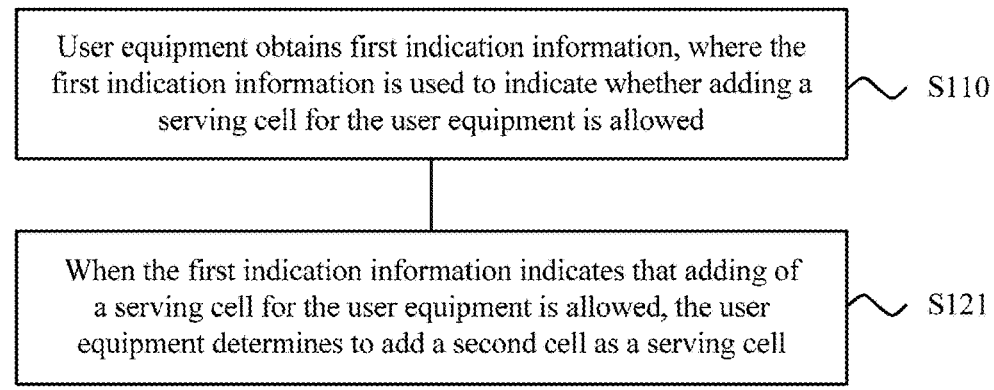
FIG. 3 is a schematic flowchart of a serving cell adding method according to an embodiment of the present invention.

Specifically, as shown in FIG. 3, in this embodiment of the present invention, the first indication information is used to indicate whether adding a serving cell for the user equipment is allowed.

That the user equipment determines, based on the first indication information, to add a second cell as a serving cell includes the following step.

S121. When the first indication information indicates that adding a serving cell for the user equipment is allowed, the user equipment determines to add the second cell as a serving cell.

It should be understood that, in this embodiment of the present invention, when the first indication information indicates that adding a serving cell for the user equipment is not allowed, the user equipment cannot autonomously determine to add a serving cell. It should be further understood that, when the user equipment obtains, by receiving a system message broadcast by the first base station in the first cell, the first indication information included in the system message, the first indication information may be used to indicate that all user equipments in the first cell can autonomously add serving cells, or none of user equipments in the first cell can autonomously add serving cells.

Figure 4:
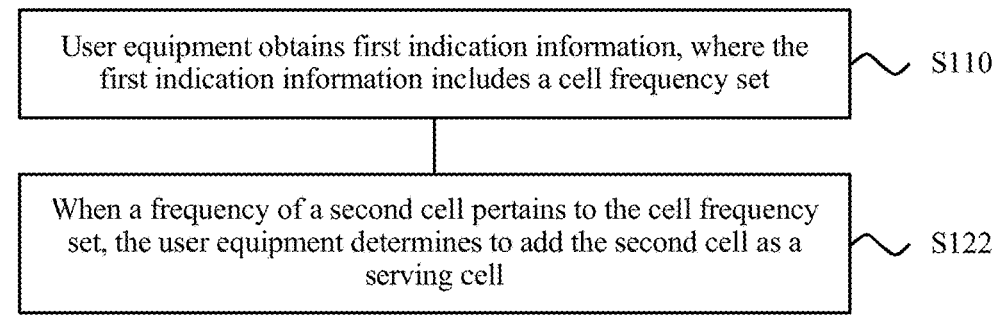
FIG. 4 is another schematic flowchart of a serving cell adding method according to an embodiment of the present invention.

In this embodiment of the present invention, optionally, as shown in FIG. 4, the first indication information includes a cell frequency set. That the user equipment determines, based on the first indication information, to add a second cell as a serving cell specifically includes the following step.

S122. When a frequency of the second cell belongs to the cell frequency set, the user equipment determines to add the second cell as a serving cell.

That is, in this embodiment of the present invention, the first indication information may include specific condition information about allowing adding a serving cell for the user equipment, for example, information about a cell frequency, a physical cell identifier, and the like. When a cell detected by the user equipment meets a condition, a serving cell can be autonomously added. Accordingly, when a cell detected by the user equipment does not meet the condition, a serving cell cannot be autonomously added.

Figure 5:
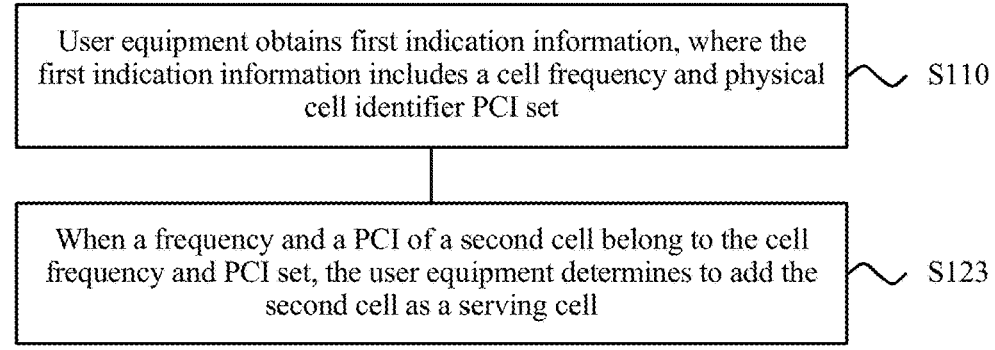
FIG. 5 is still another schematic flowchart of a serving cell adding method according to an embodiment of the present invention.

Optionally, as shown in FIG. 5, in this embodiment of the present invention, the first indication information includes a cell frequency and physical cell identifier PCI set. That the user equipment determines, based on the first indication information, to add a second cell as a serving cell specifically includes the following step.

S123. When a frequency and a PCI of the second cell belong to the cell frequency and PCI set, the user equipment determines to add the second cell as a serving cell.

Specifically, the embodiment shown in FIG. 4 may indicate that adding a cell at which frequency as a serving cell of the UE is allowed. The embodiment shown in FIG. 5 further specifically indicates that adding which cell at which frequency as a serving cell of the UE can be allowed. In this case, specific condition information about allowing the user equipment to add a serving cell is limited to a frequency and a PCI of a cell.

It should be further understood that, in this embodiment of the present invention, optionally, the first indication information includes a cell frequency set, and adding a cell whose frequency belongs to the cell frequency set as a serving cell is not allowed. That is, the first indication information is used to indicate specific condition information about not allowing the user equipment to add a serving cell, for example, information about a cell frequency and the like. That the user equipment determines, based on the first indication information, to add a second cell as a serving cell specifically includes: when a frequency of the second cell does not belong to the cell frequency set, determining, by the user equipment, to add the second cell as a serving cell. This case is appropriate when only adding a few cells as serving cells is not allowed. Therefore, whether adding a serving cell for the user equipment is allowed, or whether adding which cell as a serving cell is allowed can be indicated by using less signaling, so as to further reduce signaling overheads.

Similarly, in this embodiment of the present invention, optionally, the first indication information includes a cell frequency and physical cell identifier (Physical Cell Identity, "PCI" for short) set, and adding a cell whose frequency and PCI belong to the cell frequency and PCI set as a serving cell is not allowed. That the user equipment determines, based on the first indication information, to add a second cell as a serving cell specifically includes: when a frequency and a PCI of the second cell do not belong to the cell frequency and PCI set, determining, by the user equipment, to add the second cell as a serving cell. For brevity, details are not described herein.

It should be understood that, in this embodiment of the present invention, the user equipment may refer to other information to determine whether a serving cell can be added, or determine to add which cell as a serving cell. For example, when determining that a signal of a newly detected cell is strong enough, the user equipment may determine whether to add the cell as a serving cell. For another example, the user equipment may determine, based on other information sent by a base station to which a newly detected cell belongs, whether the cell can be added as a serving cell.

Figure 6:
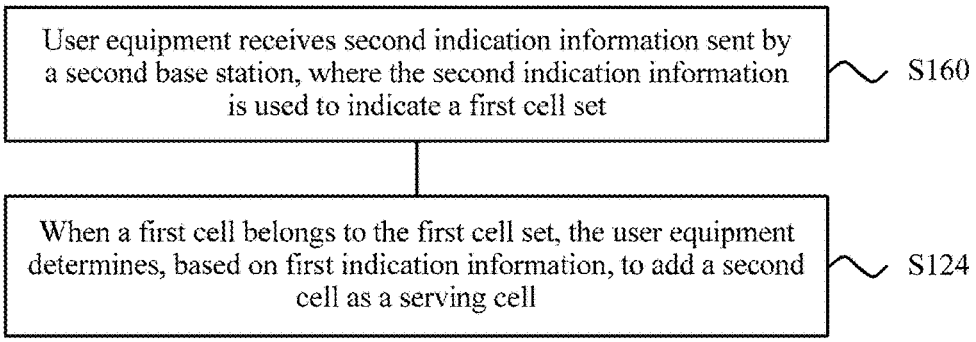
FIG. 6 is another schematic flowchart of a communication method according to an embodiment of the present invention.

Optionally, in this embodiment of the present invention, as shown in FIG. 6, the communication method 100 further includes the following step.

S160. The user equipment receives second indication information sent by the second base station, where the second indication information is used to indicate a first cell set.

That the user equipment determines, based on the first indication information, to add a second cell as a serving cell includes the following step.

S124. When the first cell belongs to the first cell set, the user equipment determines, based on the first indication information, to add the second cell as a serving cell.

Specifically, adding the second cell as a serving cell for user equipment in a cell included in the first cell set is allowed, that is, the UE can autonomously add the second cell only when a serving cell (primary cell) of the UE is a cell in the first cell set. This solution has the following advantage: When not all cells can be added as serving cells for the UE, for example, when there is no X2 interface or data is unreachable between the second cell and the first cell, a success rate of the UE for autonomously adding a serving cell can be improved by using the second indication information.

It should be further understood that, in this embodiment of the present invention, optionally, the second indication information is used to indicate a first cell set. Adding the second cell as a serving cell for user equipment in a cell included in the first cell set is not allowed, that is, the first cell set is a blacklist cell. That the user equipment determines, based on the first indication information, to add a second cell as a serving cell includes: when the first cell does not belong to the first cell set, determining, by the user equipment based on the first indication information, to add the second cell as a serving cell. This method is more applicable to a scenario in which adding most neighboring cells of the second cell as serving cells is allowed while adding a few neighboring cells is not allowed. Therefore, system signaling overheads can be further reduced.

Figure 7:
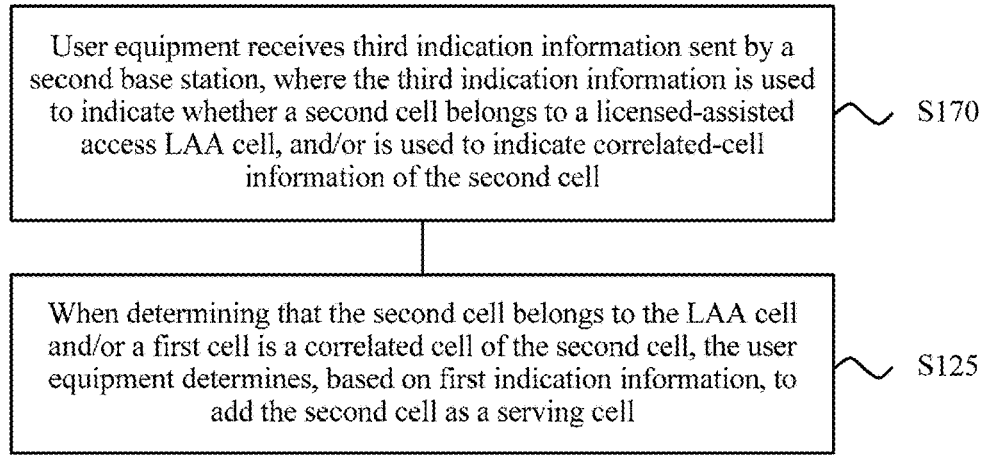
FIG. 7 is still another schematic flowchart of a communication method according to an embodiment of the present invention.

In this embodiment of the present invention, optionally, as shown in FIG. 7, the communication method 100 further includes the following step.

S170. The user equipment receives third indication information sent by the second base station, where the third indication information is used to indicate whether the second cell belongs to a licensed-assisted access (License Assisted Access, "LAN" for short) cell, and/or is used to indicate correlated-cell information of the second cell.

That the user equipment determines, based on the first indication information, to add a second cell as a serving cell includes the following step.

S125. When determining that the second cell belongs to the LAA cell and/or the first cell is a correlated cell of the second cell, the user equipment determines, based on the first indication information, to add the second cell as a serving cell.

It should be understood that, in this embodiment of the present invention, an LAA cell is a cell using a non-licensed spectrum resource. The cell cannot independently work, and must work with assistance of a cell using a licensed spectrum resource. A cell that uses a licensed spectrum resource and assists the LAA cell is a correlated cell of the LAA cell. That is, the LAA cell needs to work with assistance of a correlated cell of the LAA cell.

It should be understood that, in this embodiment of the present invention, based on one or more types of the foregoing first indication information, the user equipment may comprehensively determine whether a serving cell can be added, or further determine whether the second cell can be added as a serving cell. It should be further understood that, in this embodiment of the present invention, based on the second indication information and/or the third indication information in addition to the first indication information, the user equipment may determine whether a serving cell can be added, or determine whether the second cell can be added as a serving cell. For brevity, details are not described herein.

It should be further understood that, in this embodiment of the present invention, adding a serving cell is used only as an example to indicate or refer to adding a transmission path for communication between the user equipment and the base station. Certainly, another name or appellation, for example, adding a secondary cell or adding a transmission channel may be used.

In addition, it should be further understood that, an operation on an air interface is to add a serving cell for the user equipment. However, a transmission path on an X2 interface between the base stations needs to be set for the UE only when a cell is added for the first time, a serving cell of the UE is not concerned, and the first base station even does not need to know a quantity of serving cells added on the second base station. Therefore, in the context, to facilitate understanding, adding a serving cell is expressed for the user equipment, and adding a transmission path is expressed for the base station.

Therefore, according to the communication method in this embodiment of the present invention, user equipment obtains first indication information, determines, based on the first indication information, to add a second cell as a serving cell, and sends a first message to a second base station to which the second cell belongs, and the first message is used to request to add the second cell as a serving cell of the user equipment, so that after receiving a second message used to indicate that the serving cell of the user equipment is successfully added, the user equipment can perform data transmission with the first base station and the second base station by using the first cell and the second cell. Therefore, the user equipment can autonomously add a cell as a serving cell, and the base station can be prevented from performing centralized management on the serving cell of the user equipment, so that processing load of the base station can be alleviated, and system signaling overheads can be reduced.

In this embodiment of the present invention, the second cell detected by the user equipment and the first cell currently serving the user equipment may belong to a same base station, or may belong to different base stations. That is, in this embodiment of the present invention, the first base station and the second base station may be a same base station, or may be different base stations. The following describes in detail a case in which the first base station and the second base station are a same base station.

Figure 8:
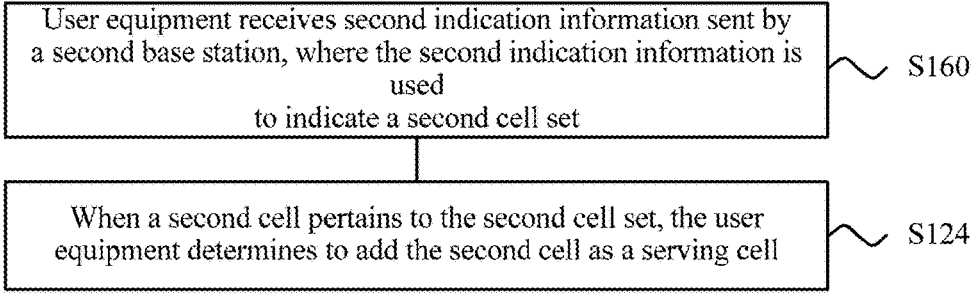
FIG. 8 is yet another schematic flowchart of a communication method according to an embodiment of the present invention.

Specifically, in this embodiment of the present invention, as shown in FIG. 8, optionally, the first base station and the second base station are a same base station, the first indication information is used to indicate a second cell set, and a cell included in the second cell set is a cell of the first base station.

That the user equipment determines, based on the first indication information, to add a second cell as a serving cell includes the following step.

S126. When the second cell belongs to the second cell set, the user equipment determines to add the second cell as a serving cell.

That is, when the UE establishes a connection to the first cell of the base station, the UE may receive the first indication information sent by the base station by using the first cell. The first indication information is used to indicate the second cell set, and a cell included in the second cell set is a cell of the first base station. When the UE detects the second cell and determines that the second cell can be used for communication, for example, when a signal of the second cell is strong enough, the UE determines whether the second cell belongs to the second cell set. When the second cell belongs to the second cell set, the user equipment may autonomously determine to add the second cell as a serving cell. Otherwise, the second cell cannot be added as a serving cell.

It should be understood that, based on other information, the user equipment may determine whether a serving cell can be added, or determine whether the second cell can be added as a serving cell. For brevity, details are not described herein.

In S130, the user equipment sends the first message to the second base station to which the second cell belongs, and the first message is used to request to add the second cell as a serving cell of the user equipment. Therefore, the second base station can exchange information with the first base station, so that the second cell can be added as a serving cell of the user equipment.

In this embodiment of the present invention, optionally, the first message includes at least one of the following information: cell identifier information of the first cell, identifier information of the user equipment, or first authentication information used to perform authentication on the user equipment.

Specifically, the cell identifier information of the first cell may be used to identify the first base station. In this case, the second base station can find the first base station according to the cell identifier information in the first message. However, it should be understood that the second base station may determine the first base station according to other information.

In this embodiment of the present invention, the identifier information of the user equipment may be used to identify the user equipment. For example, the identifier information is a cell radio network temporary identifier (Cell-Radio Network Temporary Identifier, "C-RNTI" for short). The first authentication information may be used to perform authentication on the user equipment. Specifically, for example, the first base station may find a context of corresponding UE according to a C-RNTI sent by the second base station, and may perform authentication on the UE according to the first authentication information. That is, the first base station determines whether the UE is UE of the context. If yes, a serving cell of the UE is added; otherwise, adding a serving cell is rejected, to prevent an attacker from pretending to be the UE to request to add a serving cell.

It should be understood that, in this embodiment of the present invention, the first authentication information is used to perform authentication on the user equipment, that is, to determine authenticity of the UE that requests to add a serving cell, so as to enhance network security.

In S140, the user equipment receives the second message sent by the second base station or the first base station, and the second message is used to indicate that the serving cell of the user equipment is successfully added.

In this embodiment of the present invention, optionally, the second message includes second authentication information used to perform authentication on a network. Specifically, the UE may verify, based on a key, whether the second authentication information is correct. If it is verified that the second authentication information is incorrect, it indicates that a base station sending the information may be a pseudo base station, and the UE disconnects this transmission path, so as to ensure user data security. It should be understood that, in this embodiment of the present invention, the second authentication information is used to perform authentication on the network, that is, to determine authenticity of the first base station or the second base station that sends the second message, so as to enhance network security.

In this embodiment of the present invention, after the serving cell of the user equipment is successfully added, both the first base station and the second base station can communicate with the user equipment. Therefore, the first base station or the second base station may send the second message to the user equipment, to indicate that the serving cell is successfully added, so that the user equipment can communicate with the first base station by using the second base station, for example, the user equipment can perform data transmission with the first base station.

In S150, the user equipment can communicate with the first base station and the second base station by using the first cell and the second cell. However, it should be understood that the user equipment may communicate with the first base station and/or the second base station by using the first cell and/or the second cell.

For example, the user equipment may communicate with the first base station by using the first cell, and the user equipment may communicate with the second base station by using the second cell. For another example, the user equipment may transmit information to the second base station by using the second cell, and may further transfer the information to the first base station by using the second base station, so that the user equipment can communicate with the first base station by using the second cell. For still another example, the user equipment may transmit information to the first base station by using the first cell, and may further transfer the information to the second base station by using the first base station, so that the user equipment can communicate with the second base station by using the first cell.

In this embodiment of the present invention, optionally, the second message includes the second authentication information used to perform authentication on the network.

That the user equipment communicates with the first base station and the second base station by using the first cell and the second cell includes:

after succeeding in authentication that is based on the second authentication information, communicating, by the user equipment, with the first base station and the second base station by using the first cell and the second cell.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Therefore, according to the communication method in this embodiment of the present invention, user equipment obtains first indication information, determines, based on the first indication information, to add a second cell as a serving cell, and sends a first message to a second base station to which the second cell belongs, and the first message is used to request to add the second cell as a serving cell of the user equipment, so that after receiving a second message used to indicate that the serving cell of the user equipment is successfully added, the user equipment can perform data transmission with the first base station and the second base station by using the first cell and the second cell. Therefore, the user equipment can autonomously add a cell as a serving cell, and the base station can be prevented from performing centralized management on the serving cell of the user equipment, so that processing load of the base station can be alleviated, and system signaling overheads can be reduced.

An interaction procedure of a communication method according to an embodiment of the present invention and some possible user plane protocol stacks are described in detail in the following with reference to FIG. 9 to FIG. 11D.

Figure 9:
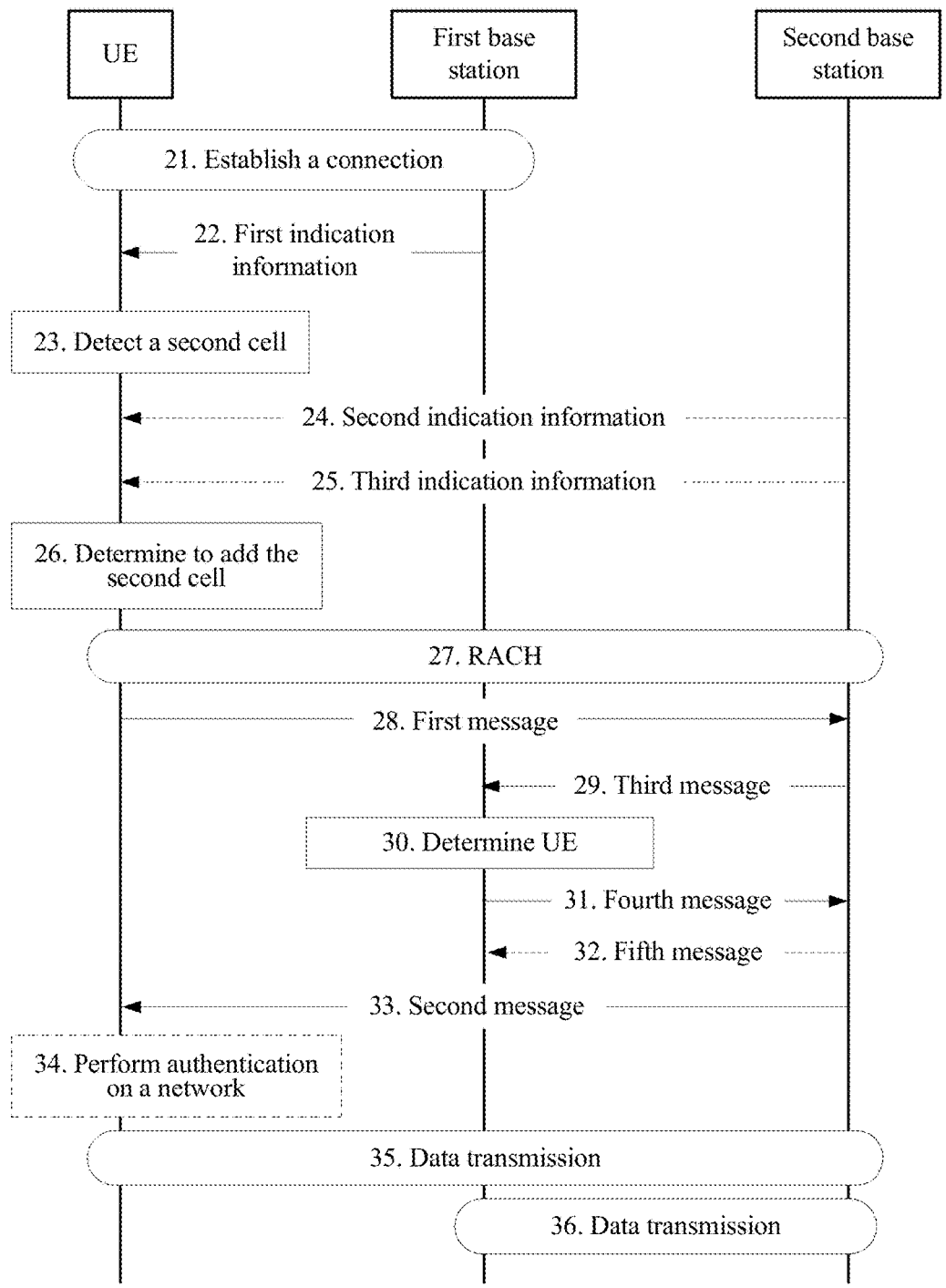
FIG. 9 is still yet another schematic flowchart of a communication method according to an embodiment of the present invention.

As shown in FIG. 9, in S21, UE establishes a communication connection to a first cell of a first base station. In this case, the first cell is a current serving cell (or referred to as a primary cell) of the UE, and a serving base station of the UE is the first base station.

In S22, the UE obtains first indication information. For example, the UE obtains the first indication information from a system message or an RRC message sent by the first base station, so that the UE determines, according to the first indication information, whether a serving cell can be added.

In S23, the UE detects that a second cell can be used for transmitting data. For example, a signal of the second cell is strong enough. For another example, signal strength of the second cell is greater than a signal strength threshold.

In S24, optionally, for example, the UE obtains second indication information from system information of the second cell. The second indication information is used to indicate a cell or a cell list. The UE can autonomously add the second cell as a serving cell only when a serving cell (primary cell) of the UE is the cell or a cell in the cell list, so as to improve a success rate of the UE for autonomously adding a transmission path.

In S25, optionally, the UE may obtain, by using the second cell, third indication information sent by a second base station, so that the UE determines, according to the third indication information, whether to autonomously add a serving cell. That is, the third indication information may be used to assist the UE in determining whether to add a serving cell.

In S26, the UE may determine, based on the first indication information, whether the second cell can be autonomously added as a serving cell. Further, the UE may determine, based on the second indication information and/or the third indication information, whether the second cell can be autonomously added as a serving cell. When the UE determines that the second cell can be autonomously added as a serving cell, the procedure proceeds to S27; otherwise, the procedure ends.

In S27, the UE initiates a random access channel (Random Access Channel, "RACH" for short) procedure in the second cell.

In S28, the UE sends a first message such as a path adding request, a serving cell adding request, or a secondary cell adding request to the second base station in the second cell, to request to add the second cell as a serving cell of the user equipment. Preferably, the first message includes cell identifier information of the first cell, identifier information of the user equipment, and first authentication information used to perform authentication on the user equipment. For example, the first message may carry first cell information (such as a frequency and a PCI), a C-RNTI of the UE in the first cell, and the first authentication information.

In S29, the second base station may send a third message to the first base station according to the first message, and the third message is used to request the first base station to add a transmission path for the user equipment. Optionally, the third message includes the identifier information of the user equipment and/or the first authentication information. Optionally, the third message may further include downlink GPRS Tunneling Protocol (GPRS Tunneling Protocol, "GTP" for short) tunnel address information of the user equipment.

Specifically, for example, the second base station may find the first base station according to the first cell information in the first message, and send the third message (such as a path adding request message) to the first base station, so as to request the first base station to add a transmission path for the UE. The third message may carry the C-RNTI and the first authentication information in the first message. The first authentication information is generated by the UE based on a key between the UE and the first base station. Alternatively, the second base station may find a corresponding control plane anchor according to the first cell information in the first message, and send the third message to the control plane anchor.

It should be understood that, in this embodiment of the present invention, the third message may not carry related information of the to-be-added second cell, that is, the first base station may not be concerned about a to-be-added cell of the second base station, so as to reduce a coupling degree.

In S30, the first base station may determine the UE. Specifically, for example, the first base station may find a context of the UE according to a C-RNTI in the first message, and may further perform authentication on the UE according to the first authentication information, to determine whether the UE is UE of the context. If the authentication fails, the request is rejected, to prevent an attacker from pretending to be the UE to request to add a serving cell. If the authentication succeeds, the procedure proceeds to S31.

In S31, the first base station may send a fourth message to the second base station according to the third message, and the fourth message is used to indicate that the transmission path of the user equipment is successfully added.

Specifically, when succeeding in authentication, the first base station may send the fourth message to the second base station. The fourth message is a response message of the third message, and is used to notify the second base station that the serving cell of the UE is successfully added.

Optionally, the fourth message includes one or more types of bearer information of the user equipment. The bearer information of the user equipment includes at least one of the following information: bearer identifier information of the user equipment, bearer quality of service (Quality of Service, "QoS" for short) information of the user equipment, or uplink GPRS Tunneling Protocol GTP tunnel address information of the user equipment. Therefore, the second base station can obtain the bearer QoS information of the UE, so that QoS of the UE can be considered during air interface scheduling. Therefore, user experience can be improved. Certainly, the fourth message may not carry the bearer information, but carry only the uplink GTP tunnel address information, to establish a single data transmission tunnel. In this way, this solution is simpler and easier to operate.

Optionally, the fourth message carries second authentication information, and the second authentication information may be generated by the first base station based on the key between the first base station and the UE.

It should be understood that, in S29 and S31, respective X2 Application Protocol (X2 Application Protocol, "X2AP" for short) IDs may be exchanged, so as to establish an X2 connection between the base stations.

In S32, optionally, the second base station sends a fifth message to the first base station, and the fifth message includes downlink GTP tunnel address information of the user equipment.

Specifically, if the fourth message carries the bearer information of the UE, the second base station sends the fifth message to the first base station. The fifth message may be used to notify the first base station of a downlink GTP tunnel address corresponding to a bearer of the UE, that is, the fifth message may carry the downlink GTP tunnel address corresponding to the bearer of the UE. Otherwise, this step is not required.

In S33, the second base station sends a second message to the user equipment, and the second message is a response message of the first message, and is used to indicate that the serving cell of the user equipment is successfully added. Optionally, if the fourth message carries the second authentication information, the second message also carries the second authentication information.

In S34, optionally, if the second message carries the second authentication information, the UE performs verification on the second authentication information based on the key between the UE and the first base station. If the verification fails, it indicates that the second base station may be a pseudo base station, and the UE may disconnect this transmission path, so as to ensure user data security. If the verification succeeds, the procedure proceeds to S35.

In S35, the UE communicates with the second base station, for example, performs data transmission with the second base station by using the second cell.

In S36, the second base station communicates with the first base station, for example, the second base station transfers data to the first base station, and the first base station may decrypt and sort the data.

Figure 10:
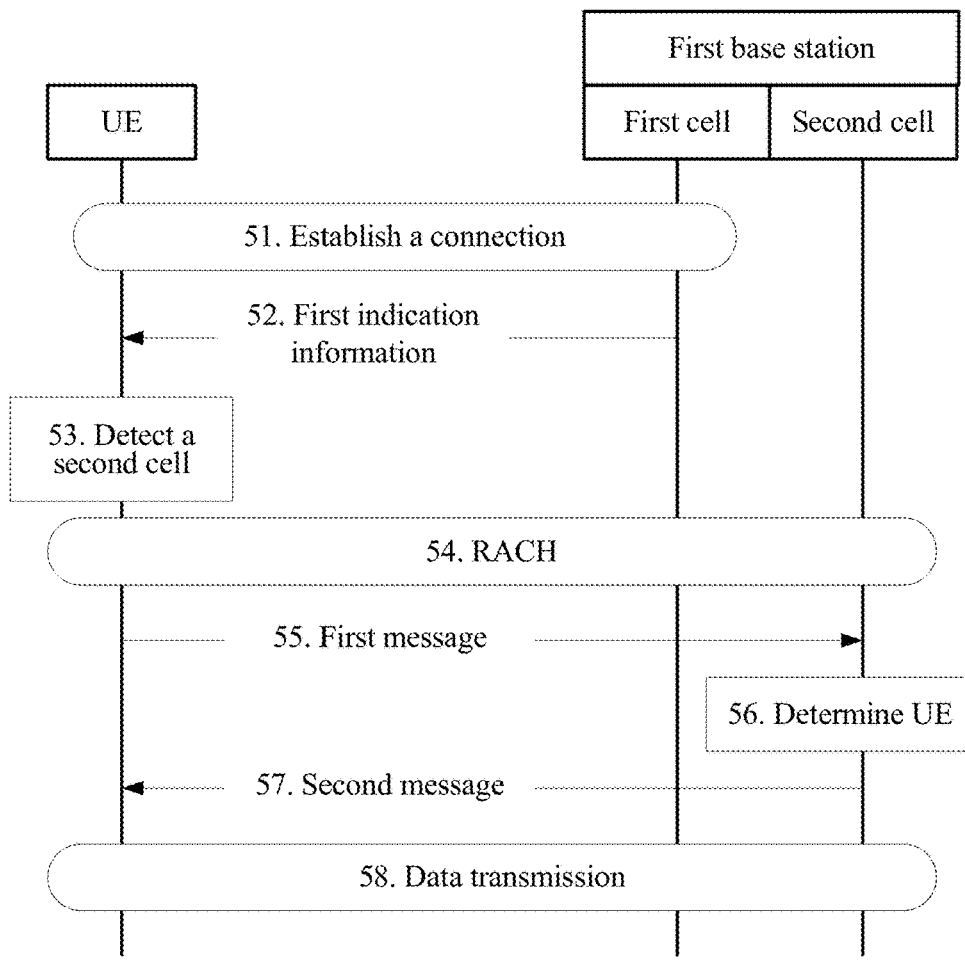
FIG. 10 is a further schematic flowchart of a communication method according to an embodiment of the present invention.
Figure 11A:
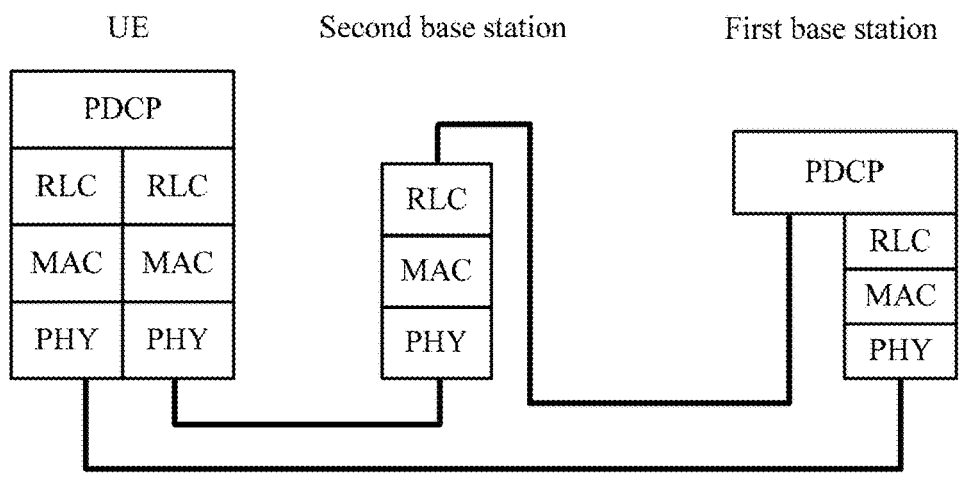
Figure 11B:
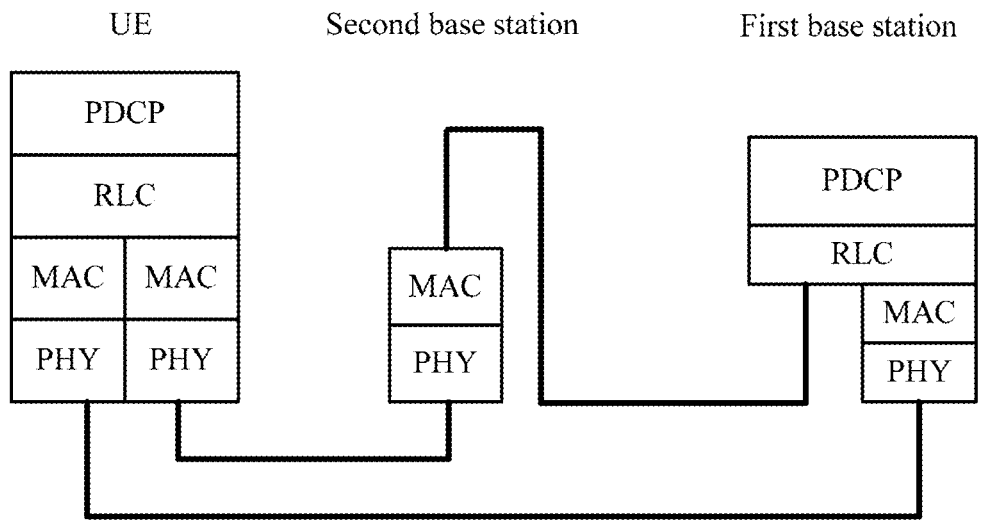
Figure 11C:
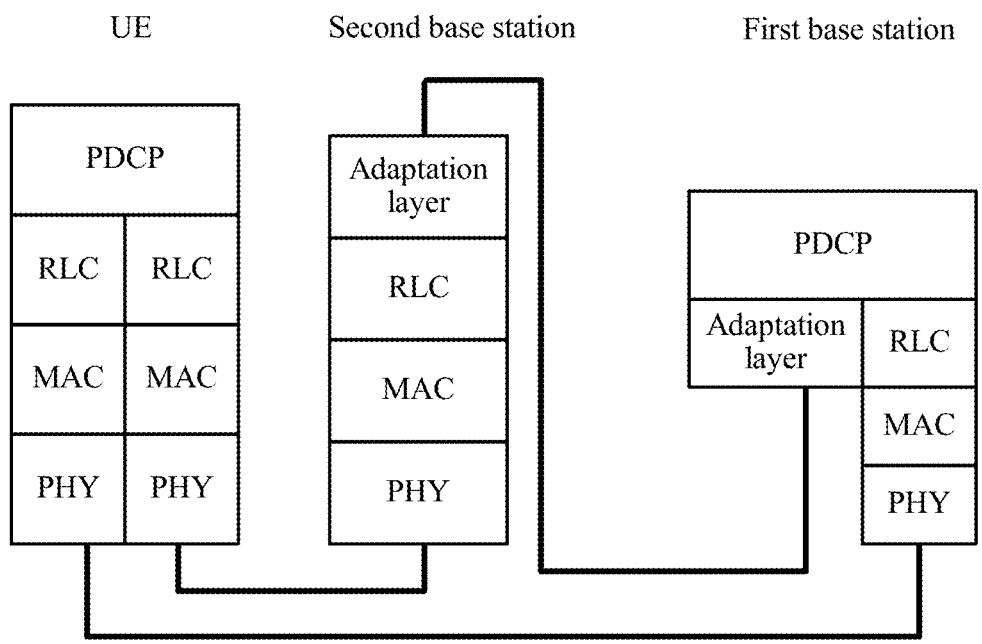

The technical solution of adding a transmission path between the base stations is described above with reference to FIG. 9, and a technical solution of adding a transmission path in a base station is described in the following with reference to FIG. 10. As shown in FIG. 10, FIG. 10 shows a further schematic flowchart of a communication method according to an embodiment of the present invention. A second cell that UE prepares to add as a serving cell and a current serving cell belong to a same base station.

In S51, the UE establishes a communication connection to a first cell of a first base station. In this case, the first cell is a current serving cell (or referred to as a primary cell) of the UE, and a serving base station of the UE is the first base station.

In S52, the UE obtains, by using the first cell, first indication information sent by the first base station, the first indication information is used to indicate a second cell set, and a cell included in the second cell set is a cell of the first base station.

In S53, the UE detects that a second cell can be used for transmitting data. For example, a signal of the second cell is strong enough. For another example, signal strength of the second cell is greater than a signal strength threshold. When the second cell belongs to the second cell set, the UE may determine to add the second cell as a serving cell.

In S54, the UE initiates a random access channel (Random Access Channel, "RACH" for short) procedure in the second cell.

In S55, the UE sends a first message such as a path adding request, a serving cell adding request, or a secondary cell adding request to the first base station in the second cell, to request to add the second cell as a serving cell of the user equipment. Preferably, the first message includes cell identifier information of the first cell, identifier information of the user equipment, and first authentication information used to perform authentication on the user equipment. For example, the first message may carry first cell information (such as a frequency and a PCI), a C-RNTI of the UE in the first cell, and the first authentication information.

In S56, the first base station may determine the UE. Specifically, for example, the first base station may find a context of the UE according to the C-RNTI in the first message, and may further perform authentication on the UE according to the first authentication information, to determine whether the UE is UE of the context. If the authentication fails, the request is rejected, to prevent an attacker from pretending to be the UE to request to add a serving cell. If the authentication succeeds, the procedure proceeds to S57.

In S57, the first base station sends a second message to the user equipment by using the second cell, and the second message is a response message of the first message, and is used to indicate that the serving cell of the user equipment is successfully added.

In S58, the UE may communicate with the first base station by using the first cell and the second cell.

In this embodiment of the present invention, the UE may perform splitting at a Packet Data Convergence Protocol (Packet Data Convergence Protocol, "PDCP" for short) layer, or perform splitting at a Radio Link Control (Radio Link Control, "RLC" for short) layer. Specifically, a user plane protocol stack existing when the UE performs splitting at the PDCP layer may be shown in FIG. 11A. A bearer GTP tunnel is established on an X2 interface. MAC represents a Media Access Control (Media Access Control, "MAC" for short) layer. PHY represents a physical layer (Physical Layer). A user plane protocol stack existing when the UE performs splitting at the RLC layer may be shown in FIG. 11B. A bearer GTP tunnel is established on an X2 interface.

In another aspect, when not all bearer GTP tunnels are established on the X2 interface, but only a uniform tunnel is established on the X2 interface, an adaptation layer (Adapter) needs to be added between a second base station and the first base station. At the adaptation layer, bearer information of each packet is placed at a packet header, so that the first base station (for uplink data) or the UE (for downlink data) can learn of a bearer of the data packet, so as to perform decryption. Specifically, a user plane protocol stack existing when the UE performs splitting at the PDCP layer may be shown in FIG. 11C. A uniform tunnel is established on an X2 interface. A user plane protocol stack existing when the UE performs splitting at the RLC layer may be shown in FIG. 11D. A uniform tunnel is established on an X2 interface.

Therefore, according to the communication method in this embodiment of the present invention, user equipment obtains first indication information, determines, based on the first indication information, to add a second cell as a serving cell, and sends a first message to a second base station to which the second cell belongs, and the first message is used to request to add the second cell as a serving cell of the user equipment, so that after receiving a second message used to indicate that the serving cell of the user equipment is successfully added, the user equipment can perform data transmission with the first base station and the second base station by using the first cell and the second cell. Therefore, the user equipment can autonomously add a cell as a serving cell, and the base station can be prevented from performing centralized management on the serving cell of the user equipment, so that processing load of the base station can be alleviated, and system signaling overheads can be reduced.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It should be further understood that, in this embodiment of the present invention, the UE may also autonomously determine whether to delete the second cell, that is, not to use the second cell as a serving cell of the UE any longer. For example, when the signal of the second cell becomes poor, the UE may directly send a command of deleting the second cell to the second base station. However, because the signal of the second cell may be extremely poor, the command may fail to be sent to the second base station. Therefore, preferably, the UE may send the command of deleting the second cell to the first base station, and then, the first base station may instruct the second base station to delete a related UE context.

It should be further understood that, in this embodiment of the present invention, the first base station may actively initiate a command of deleting the second cell to the UE. For example, when the first base station determines to perform handover, or when the UE receives a handover command, the second cell may be automatically deleted, and the first base station may instruct the second base station to delete a related UE context.

Therefore, in this embodiment of the present invention, UE may autonomously determine whether to add or delete a serving cell, so that a base station can be prevented from performing centralized management on the serving cell of the user equipment. Therefore, processing load of the base station can be alleviated, and system signaling overheads can be reduced.

A communication method according to an embodiment of the present invention is described above in detail from a perspective of user equipment with reference to FIG. 1 to FIG. 8, and an interaction procedure between user equipment and a base station is described with reference to FIG. 9 to FIG. 11D. Communication methods according to embodiments of the present invention are separately described in the following from perspectives of a second base station and a first base station with reference to FIG. 12 to FIG. 16.

FIG. 12 shows a schematic flowchart of a communication method 200 according to another embodiment of the present invention. The method 200 may be executed by a base station. For example, the base station is an eNB. As shown in FIG. 12, the communication method 200 includes the following steps.

S210. A second base station receives a first message sent by user equipment, where the first message is used to request to add a second cell of the second base station as a serving cell of the user equipment, the user equipment is in a radio resource control RRC connected mode, a serving base station of the user equipment is a first base station, and a serving cell of the user equipment is a first cell of the first base station.

S220. The second base station sends a second message to the user equipment, where the second message is used to indicate that the serving cell of the user equipment is successfully added.

S230. The second base station communicates with the user equipment by using the second cell.

Specifically, in this embodiment of the present invention, when the user equipment is in a radio resource control RRC connected mode, if the user equipment autonomously determines to add the second cell as a serving cell of the user equipment, the user equipment may send a serving cell adding request to the second base station to which the second cell belongs. In this case, the second base station may receive the first message sent by the user equipment, and may send the second message to the user equipment after the second base station adds the serving cell for the user equipment, to indicate that the serving cell is successfully added. Therefore, the user equipment can not only communicate with the first base station by using the first cell, but also communicate with the second base station by using the second cell.

Therefore, according to the communication method in this embodiment of the present invention, a second base station receives a first message that is autonomously sent by user equipment and that is used to request to add a second cell of the second base station as a serving cell of the user equipment, and after the serving cell of the user equipment is successfully added, communicates with the user equipment by using the second cell, so that the user equipment can autonomously add a cell as a serving cell, and the base station can be prevented from performing centralized management on the serving cell of the user equipment. Therefore, processing load of the base station can be alleviated, and system signaling overheads can be reduced.

Figure 13:
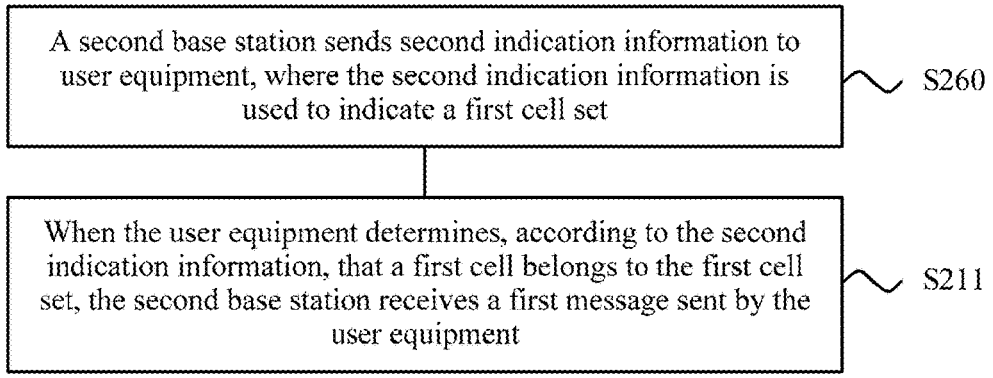
FIG. 13 is another schematic flowchart of a communication method according to another embodiment of the present invention.

In this embodiment of the present invention, optionally, as shown in FIG. 13, the communication method 200 further includes the following step.

S260. The second base station sends second indication information to the user equipment, where the second indication information is used to indicate a first cell set.

That a second base station receives a first message sent by user equipment includes the following step.

S211. When the user equipment determines, according to the second indication information, that the first cell belongs to the first cell set, the second base station receives the first message sent by the user equipment.

Specifically, adding the second cell as a serving cell for user equipment in a cell included in the first cell set is allowed, that is, the UE can autonomously add the second cell only when a serving cell (primary cell) of the UE is a cell in the first cell set. This solution has the following advantage: When not all cells can be added as serving cells for the UE, for example, when there is no X2 interface or data is unreachable between the second cell and the first cell, a success rate of the UE for autonomously adding a serving cell can be improved by using the second indication information.

Figure 14:
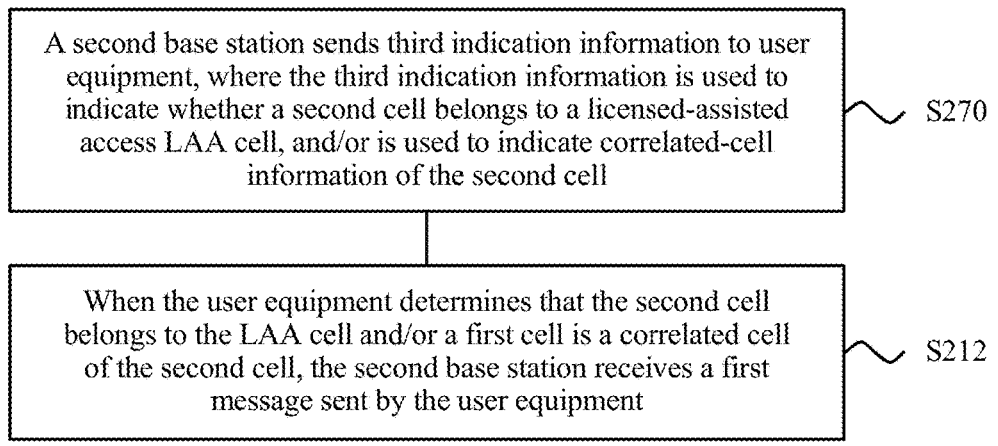
FIG. 14 is still another schematic flowchart of a communication method according to another embodiment of the present invention.

Optionally, in this embodiment of the present invention, as shown in FIG. 14, the communication method 200 further includes the following step.

S270. The second base station sends third indication information to the user equipment, where the third indication information is used to indicate whether the second cell belongs to a licensed-assisted access LAA cell, and/or is used to indicate correlated-cell information of the second cell.

That a second base station receives a first message sent by user equipment includes the following step.

S212. When the user equipment determines that the second cell belongs to the LAA cell and/or the first cell is a correlated cell of the second cell, the second base station receives the first message sent by the user equipment.

In this embodiment of the present invention, optionally, the first message includes at least one of the following information: cell identifier information of the first cell, identifier information of the user equipment, or first authentication information used to perform authentication on the user equipment.

Figure 15:
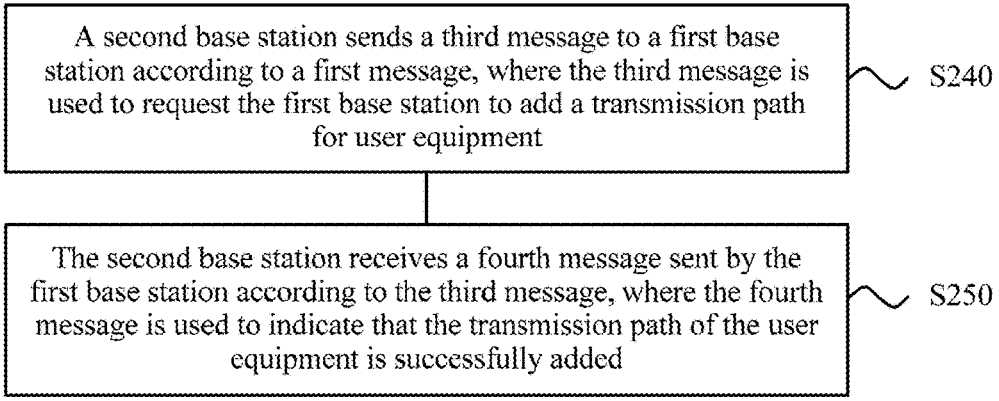
FIG. 15 is yet another schematic flowchart of a communication method according to another embodiment of the present invention.

In this embodiment of the present invention, optionally, as shown in FIG. 15, the communication method 200 further includes the following steps.

S240. The second base station sends a third message to the first base station according to the first message, where the third message is used to request the first base station to add a transmission path for the user equipment.

S250. The second base station receives a fourth message sent by the first base station according to the third message, where the fourth message is used to indicate that the transmission path of the user equipment is successfully added.

Specifically, in this embodiment of the present invention, optionally, the first message includes at least one of the following information: cell identifier information of the first cell, identifier information of the user equipment, or first authentication information used to perform authentication on the user equipment. The third message includes the identifier information of the user equipment and/or the first authentication information.

For example, the first message that is received by the second base station and that is sent by the user equipment may carry first cell information (such as a frequency and a PCI), a C-RNTI of the UE in the first cell, and the first authentication information. For example, the second base station may find the first base station according to the first cell information in the first message, and send the third message to the first base station, so as to request the first base station to add a serving cell for the UE. The third message may carry the C-RNTI and the first authentication information in the first message. The first authentication information is generated by the UE based on a key between the UE and the first base station. Alternatively, the second base station may find a corresponding control plane anchor according to the first cell information in the first message, and send the third message to the control plane anchor.

In this embodiment of the present invention, optionally, the third message may not carry related information of the to-be-added second cell, that is, the first base station may not be concerned about a to-be-added cell of the second base station, so as to reduce a coupling degree.

In this embodiment of the present invention, optionally, the fourth message includes bearer information of the user equipment. The bearer information of the user equipment includes at least one of the following information: bearer identifier information of the user equipment, bearer quality of service QoS information of the user equipment, or uplink GPRS Tunneling Protocol GTP tunnel address information of the user equipment.

Therefore, the second base station can obtain the bearer QoS information of the UE, so that QoS of the UE can be considered during air interface scheduling. Therefore, user experience can be improved. Certainly, the fourth message may not carry the foregoing information. In this way, this solution is simpler and easier to operate.

Optionally, the fourth message carries second authentication information, and the second authentication information may be generated by the first base station based on the key between the first base station and the UE.

In this embodiment of the present invention, optionally, the communication method further includes: sending, by the second base station, a fifth message to the first base station, where the fifth message includes downlink GTP tunnel address information of the user equipment.

It should be understood that, in this embodiment of the present invention, the second base station may send the downlink GTP tunnel address information to the user equipment by using the third message. That is, in this embodiment of the present invention, optionally, the third message includes the downlink GTP tunnel address information of the user equipment.

In this embodiment of the present invention, optionally, the fourth message and the second message include the second authentication information used to perform authentication on a network.

That the second base station communicates with the user equipment by using the second cell specifically includes: after the user equipment succeeds in authentication that is based on the second authentication information, communicating, by the second base station, with the user equipment by using the second cell.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It should be further understood that interaction between the UE, the first base station, and the second base station, and related features and functions described from a perspective of the second base station are corresponding to those described from a perspective of the user equipment. For brevity, details are not described herein again.

Therefore, according to the communication method in this embodiment of the present invention, a second base station receives a first message that is autonomously sent by user equipment and that is used to request to add a second cell of the second base station as a serving cell of the user equipment, and after the serving cell of the user equipment is successfully added, communicates with the user equipment by using the second cell, so that the user equipment can autonomously add a cell as a serving cell, and the base station can be prevented from performing centralized management on the serving cell of the user equipment. Therefore, processing load of the base station can be alleviated, and system signaling overheads can be reduced.

Figure 16:
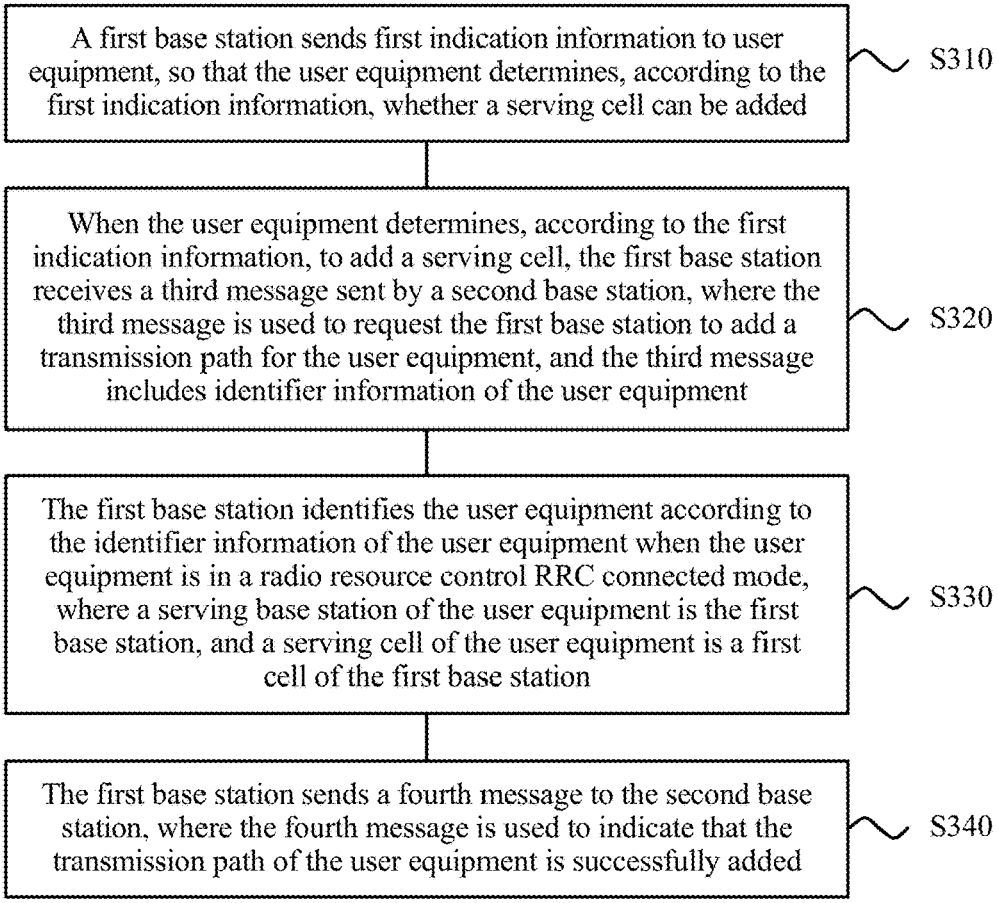
FIG. 16 is a schematic flowchart of a communication method according to still another embodiment of the present invention.

FIG. 16 shows a schematic flowchart of a communication method 300 according to still another embodiment of the present invention. The method 300 may be executed by a base station. For example, the base station is an eNB. As shown in FIG. 16, the communication method 300 includes the following steps.

S310. A first base station sends first indication information to user equipment, so that the user equipment determines, according to the first indication information, whether a serving cell can be added.

S320. When the user equipment determines, according to the first indication information, to add a serving cell, the first base station receives a third message sent by a second base station, where the third message is used to request the first base station to add a transmission path for the user equipment, and the third message includes identifier information of the user equipment.

S330. The first base station identifies the user equipment according to the identifier information of the user equipment when the user equipment is in a radio resource control RRC connected mode, where a serving base station of the user equipment is the first base station, and a serving cell of the user equipment is a first cell of the first base station.

S340. The first base station sends a fourth message to the second base station, where the fourth message is used to indicate that the transmission path of the user equipment is successfully added.

Therefore, according to the communication method in this embodiment of the present invention, a first base station sends first indication information to user equipment, so that the user equipment determines, based on the first indication information, whether a serving cell can be autonomously added, and when the user equipment is in an RRC connected mode and determines that the serving cell can be added, requests the first base station and a second base station to add the serving cell for the user equipment. Therefore, the user equipment can autonomously add a cell as a serving cell, and the base station can be prevented from performing centralized management on the serving cell of the user equipment, so that processing load of the base station can be alleviated, and system signaling overheads can be reduced.

In this embodiment of the present invention, optionally, the communication method 300 further includes:

sending, by the first base station, a second message to the user equipment when the user equipment requests, according to the first indication information, to add a second cell as a serving cell, where the second message is used to indicate that the second cell is successfully added as a serving cell of the user equipment.

In this embodiment of the present invention, optionally, the communication method 300 further includes:

receiving, by the first base station, a fifth message sent by the second base station, where the fifth message includes downlink GTP tunnel address information of the user equipment.

In this embodiment of the present invention, optionally, the first indication information is used to indicate whether adding a serving cell for the user equipment is allowed; or the first indication information includes a cell frequency set; or the first indication information includes a cell frequency and physical cell identifier PCI set; or the first indication information includes trigger condition information about adding a serving cell.

In this embodiment of the present invention, optionally, the fourth message includes bearer information of the user equipment. The bearer information of the user equipment includes at least one of the following information: bearer identifier information of the user equipment, bearer quality of service QoS information of the user equipment, or uplink GPRS Tunneling Protocol GTP tunnel address information of the user equipment.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It should be further understood that interaction between the UE, the first base station, and the second base station, and related features and functions described from a perspective of the first base station are corresponding to those described from a perspective of the user equipment. For brevity, details are not described herein again.

Therefore, according to the communication method in this embodiment of the present invention, a first base station sends first indication information to user equipment, so that the user equipment determines, based on the first indication information, whether a serving cell can be autonomously added, and when the user equipment is in an RRC connected mode and determines that the serving cell can be added, requests the first base station and a second base station to add the serving cell for the user equipment. Therefore, the user equipment can autonomously add a cell as a serving cell, and the base station can be prevented from performing centralized management on the serving cell of the user equipment, so that processing load of the base station can be alleviated, and system signaling overheads can be reduced.

The communication methods according to the embodiments of the present invention are described above in detail with reference to FIG. 1 to FIG. 16, and a base station and user equipment according to embodiments of the present invention are described in the following with reference to FIG. 17 to FIG. 22.

Figure 17:
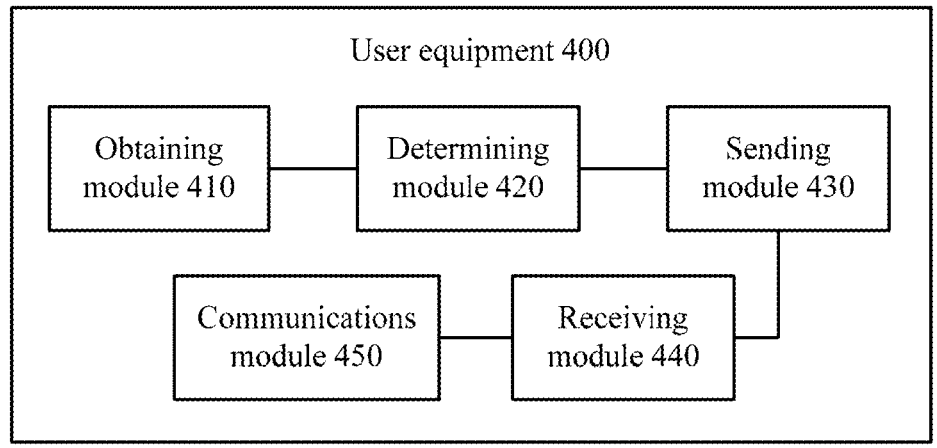
FIG. 17 is a schematic block diagram of user equipment according to an embodiment of the present invention.

FIG. 17 shows a schematic block diagram of user equipment 400 according to an embodiment of the present invention. As shown in FIG. 17, the user equipment 400 includes:

an obtaining module 410, configured to obtain first indication information, so that the user equipment determines, according to the first indication information, whether a serving cell can be added;

a determining module 420, configured to: when the user equipment is in a radio resource control RRC connected mode, determine, based on the first indication information, to add a second cell as a serving cell, where a serving base station of the user equipment is a first base station, and a serving cell of the user equipment is a first cell of the first base station;

a sending module 430, configured to send a first message to a second base station to which the second cell belongs, where the first message is used to request to add the second cell as a serving cell of the user equipment;

a receiving module 440, configured to receive a second message sent by the second base station or the first base station, where the second message is used to indicate that the serving cell of the user equipment is successfully added; and a communications module 450, configured to communicate with the first base station and the second base station by using the first cell and the second cell.

Therefore, according to the user equipment in this embodiment of the present invention, the user equipment obtains first indication information, determines, based on the first indication information, to add a second cell as a serving cell, and sends a first message to a second base station to which the second cell belongs, and the first message is used to request to add the second cell as a serving cell of the user equipment, so that after receiving a second message used to indicate that the serving cell of the user equipment is successfully added, the user equipment can perform data transmission with the first base station and the second base station by using the first cell and the second cell. Therefore, the user equipment can autonomously add a cell as a serving cell, and the base station can be prevented from performing centralized management on the serving cell of the user equipment, so that processing load of the base station can be alleviated, and system signaling overheads can be reduced.

In this embodiment of the present invention, optionally, the first indication information obtained by the obtaining module 410 is used to indicate whether adding a serving cell for the user equipment is allowed.

The determining module 420 is specifically configured to: when the first indication information indicates that adding a serving cell for the user equipment is allowed, determine to add the second cell as a serving cell.

In this embodiment of the present invention, optionally, the first indication information obtained by the obtaining module 410 includes a cell frequency set. The determining module 420 is specifically configured to: when a frequency of the second cell belongs to the cell frequency set, determine to add the second cell as a serving cell.

In this embodiment of the present invention, optionally, the first indication information obtained by the obtaining module 410 includes a cell frequency and physical cell identifier PCI set. The determining module 420 is specifically configured to: when a frequency and a PCI of the second cell belong to the cell frequency and PCI set, determine to add the second cell as a serving cell.

In this embodiment of the present invention, optionally, the receiving module 440 is further configured to receive second indication information sent by the second base station, and the second indication information is used to indicate a first cell set.

The determining module 420 is specifically configured to: when the first cell belongs to the first cell set, determine to add the second cell as a serving cell.

In this embodiment of the present invention, optionally, the first indication information obtained by the obtaining module 410 includes trigger condition information about adding a serving cell.

In this embodiment of the present invention, optionally, the receiving module 440 is further configured to receive third indication information sent by the second base station, and the third indication information is used to indicate whether the second cell belongs to a licensed-assisted access LAA cell, and/or is used to indicate correlated-cell information of the second cell.

The determining module 420 is specifically configured to: when it is determined that the second cell belongs to the LAA cell and/or the first cell is a correlated cell of the second cell, determine, based on the first indication information, to add the second cell as a serving cell.

In this embodiment of the present invention, optionally, when the first base station and the second base station are a same base station, the first indication information is used to indicate a second cell set, and a cell included in the second cell set is a cell of the first base station, the determining module 420 is specifically configured to: when the second cell belongs to the second cell set, determine to add the second cell as a serving cell.

In this embodiment of the present invention, optionally, the first message sent by the sending module 430 includes at least one of the following information: cell identifier information of the first cell, identifier information of the user equipment, or first authentication information used to perform authentication on the user equipment.

In this embodiment of the present invention, optionally, the second message received by the receiving module 440 includes second authentication information used to perform authentication on a network.

The communications module 450 is specifically configured to: after authentication that is based on the second authentication information succeeds, communicate with the first base station and the second base station by using the first cell and the second cell.

The user equipment 400 according to this embodiment of the present invention may be corresponding to UE in a communication method according to an embodiment of the present invention, and the foregoing and other operations and/or functions of modules in the user equipment 400 are separately used to implement corresponding procedures of the methods 100 to 300 in FIG. 1 to FIG. 16. For brevity, details are not described herein again.

Therefore, according to the user equipment in this embodiment of the present invention, the user equipment obtains first indication information, determines, based on the first indication information, to add a second cell as a serving cell, and sends a first message to a second base station to which the second cell belongs, and the first message is used to request to add the second cell as a serving cell of the user equipment, so that after receiving a second message used to indicate that the serving cell of the user equipment is successfully added, the user equipment can perform data transmission with the first base station and the second base station by using the first cell and the second cell. Therefore, the user equipment can autonomously add a cell as a serving cell, and the base station can be prevented from performing centralized management on the serving cell of the user equipment, so that processing load of the base station can be alleviated, and system signaling overheads can be reduced.

Figure 18:
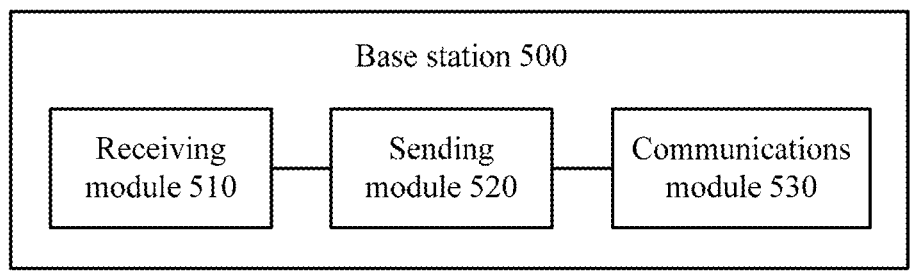
FIG. 18 is a schematic block diagram of a base station according to an embodiment of the present invention.

FIG. 18 shows a schematic block diagram of a base station 500 according to an embodiment of the present invention. As shown in FIG. 18, the base station 500 includes:

a receiving module 510, configured to receive a first message sent by user equipment, where the first message is used to request to add a second cell of the base station as a serving cell of the user equipment, the user equipment is in a radio resource control RRC connected mode, a serving base station of the user equipment is a first base station, and a serving cell of the user equipment is a first cell of the first base station;

a sending module 520, configured to send a second message to the user equipment, where the second message is used to indicate that the serving cell of the user equipment is successfully added; and a communications module 530, configured to communicate with the user equipment by using the second cell.

Therefore, according to the base station in this embodiment of the present invention, the base station receives a first message that is autonomously sent by user equipment and that is used to request to add a second cell of the second base station as a serving cell of the user equipment, and after the serving cell of the user equipment is successfully added, communicates with the user equipment by using the second cell, so that the user equipment can autonomously add a cell as a serving cell, and the base station can be prevented from performing centralized management on the serving cell of the user equipment. Therefore, processing load of the base station can be alleviated, and system signaling overheads can be reduced.

In this embodiment of the present invention, optionally, the sending module 520 is further configured to send a third message to the first base station according to the first message, and the third message is used to request the first base station to add a transmission path for the user equipment.

The receiving module 510 is further configured to receive a fourth message sent by the first base station according to the third message, and the fourth message is used to indicate that the transmission path of the user equipment is successfully added.

In this embodiment of the present invention, optionally, the sending module 520 is further configured to send second indication information to the user equipment, and the second indication information is used to indicate a first cell set.

The receiving module 510 is specifically configured to: when the user equipment determines, according to the second indication information, that the first cell belongs to the first cell set, receive the first message sent by the user equipment.

In this embodiment of the present invention, optionally, the sending module 520 is further configured to send third indication information to the user equipment, and the third indication information is used to indicate whether the second cell belongs to a licensed-assisted access LAA cell, and/or is used to indicate correlated-cell information of the second cell.

The receiving module 510 is specifically configured to: when the user equipment determines that the second cell belongs to the LAA cell and/or the first cell is a correlated cell of the second cell, receive the first message sent by the user equipment.

In this embodiment of the present invention, optionally, the fourth message received by the receiving module 510 includes bearer information of the user equipment. The bearer information of the user equipment includes at least one of the following information: bearer identifier information of the user equipment, bearer quality of service QoS information of the user equipment, or uplink GPRS Tunneling Protocol GTP tunnel address information of the user equipment.

In this embodiment of the present invention, optionally, the sending module 520 is further configured to send a fifth message to the first base station, and the fifth message includes downlink GTP tunnel address information of the user equipment.

In this embodiment of the present invention, optionally, the fourth message received by the receiving module 510 and the second message sent by the sending module 520 include second authentication information used to perform authentication on a network. The communications module 530 is specifically configured to: after the user equipment succeeds in authentication that is based on the second authentication information, communicate with the user equipment by using the second cell.

In this embodiment of the present invention, optionally, the first message received by the receiving module 510 includes at least one of the following information: cell identifier information of the first cell, identifier information of the user equipment, or first authentication information used to perform authentication on the user equipment. The third message sent by the sending module 520 includes the identifier information of the user equipment and/or the first authentication information.

The base station 500 according to this embodiment of the present invention may be corresponding to a second base station in a communication method according to an embodiment of the present invention, and the foregoing and other operations and/or functions of modules in the base station 500 are separately used to implement corresponding procedures of the methods 100 to 300 in FIG. 1 to FIG. 16. For brevity, details are not described herein again.

Therefore, according to the base station in this embodiment of the present invention, a second base station receives a first message that is autonomously sent by user equipment and that is used to request to add a second cell of the second base station as a serving cell of the user equipment, and after the serving cell of the user equipment is successfully added, communicates with the user equipment by using the second cell, so that the user equipment can autonomously add a cell as a serving cell, and the base station can be prevented from performing centralized management on the serving cell of the user equipment. Therefore, processing load of the base station can be alleviated, and system signaling overheads can be reduced.

Figure 19:
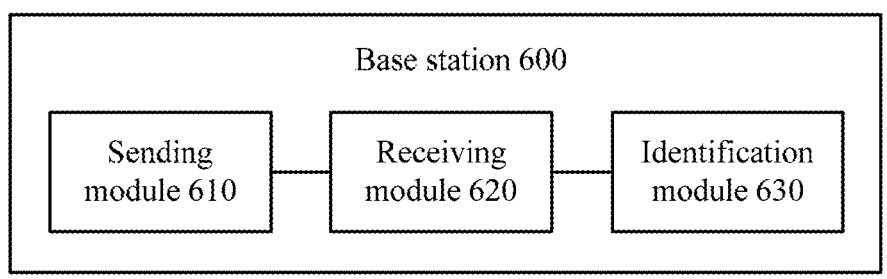
FIG. 19 is a schematic block diagram of a base station according to another embodiment of the present invention.

FIG. 19 shows a schematic block diagram of a base station 600 according to another embodiment of the present invention. As shown in FIG. 19, the base station 600 includes:

a sending module 610, configured to send first indication information to user equipment, so that the user equipment determines, according to the first indication information, whether a serving cell can be added;

a receiving module 620, configured to: when the user equipment determines, according to the first indication information, to add a serving cell, receive a third message sent by a second base station, where the third message is used to request the base station to add a transmission path for the user equipment, and the third message includes identifier information of the user equipment; and an identification module 630, configured to identify the user equipment according to the identifier information of the user equipment when the user equipment is in a radio resource control RRC connected mode, where a serving base station of the user equipment is the base station, and a serving cell of the user equipment is a first cell of the base station.

The sending module 610 is further configured to send a fourth message to the second base station, and the fourth message is used to indicate that the transmission path of the user equipment is successfully added.

Therefore, according to the base station in this embodiment of the present invention, the base station sends first indication information to user equipment, so that the user equipment determines, based on the first indication information, whether a serving cell can be autonomously added, and when the user equipment is in an RRC connected mode and determines that the serving cell can be added, requests the first base station and a second base station to add the serving cell for the user equipment. Therefore, the user equipment can autonomously add a cell as a serving cell, and the base station can be prevented from performing centralized management on the serving cell of the user equipment, so that processing load of the base station can be alleviated, and system signaling overheads can be reduced.

In this embodiment of the present invention, optionally, the sending module 610 is further configured to send a second message to the user equipment when the user equipment requests, according to the first indication information, to add a second cell as a serving cell, and the second message is used to indicate that the second cell is successfully added as a serving cell of the user equipment.

In this embodiment of the present invention, optionally, the receiving module 620 is further configured to receive a fifth message sent by the second base station, and the fifth message includes downlink GTP tunnel address information of the user equipment.

In this embodiment of the present invention, optionally, the first indication information sent by the sending module 610 is used to indicate whether adding a serving cell for the user equipment is allowed; or the first indication information sent by the sending module 610 includes a cell frequency set; or the first indication information sent by the sending module 610 includes a cell frequency and physical cell identifier PCI set; or the first indication information sent by the sending module 610 includes trigger condition information about adding a serving cell.

In this embodiment of the present invention, optionally, the fourth message sent by the sending module 610 includes bearer information of the user equipment. The bearer information of the user equipment includes at least one of the following information: bearer identifier information of the user equipment, bearer quality of service QoS information of the user equipment, or uplink GPRS Tunneling Protocol GTP tunnel address information of the user equipment.

The base station 600 according to this embodiment of the present invention may be corresponding to a first base station in a communication method according to an embodiment of the present invention, and the foregoing and other operations and/or functions of modules in the base station 600 are separately used to implement corresponding procedures of the methods 100 to 300 in FIG. 1 to FIG. 16. For brevity, details are not described herein again.

Therefore, according to the base station in this embodiment of the present invention, a first base station sends first indication information to user equipment, so that the user equipment determines, based on the first indication information, whether a serving cell can be autonomously added, and when the user equipment is in an RRC connected mode and determines that the serving cell can be added, requests the first base station and a second base station to add the serving cell for the user equipment. Therefore, the user equipment can autonomously add a cell as a serving cell, and the base station can be prevented from performing centralized management on the serving cell of the user equipment, so that processing load of the base station can be alleviated, and system signaling overheads can be reduced.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of the present invention, "B corresponding to A" indicates that B is associated with A and that B may be determined according to A. However, it should be further understood that determining B according to A does not mean that B is determined only according to A, and B may be determined according to A and/or other information.

Figure 20:
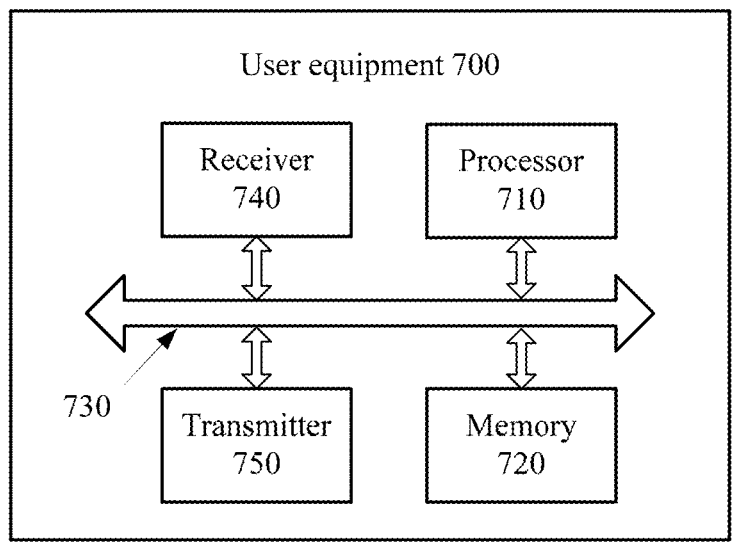
FIG. 20 is another schematic block diagram of user equipment according to an embodiment of the present invention.

As shown in FIG. 20, an embodiment of the present invention further provides user equipment 700, and the user equipment 700 includes a processor 710, a memory 720, a bus system 730, a receiver 740, and a transmitter 750. The processor 710, the memory 720, the receiver 740, and the transmitter 750 are connected to each other by using the bus system 730, the memory 720 is configured to store an instruction, and the processor 710 is configured to execute the instruction stored in the memory 720, to control the receiver 740 to receive a signal and control the transmitter 750 to send a signal. The processor 710 is configured to: obtain first indication information, so that the user equipment determines, according to the first indication information, whether a serving cell can be added; and when the user equipment is in a radio resource control RRC connected mode, determine, based on the first indication information, to add a second cell as a serving cell, where a serving base station of the user equipment is a first base station, and a serving cell of the user equipment is a first cell of the first base station. The transmitter 750 is configured to send a first message to a second base station to which the second cell belongs, and the first message is used to request to add the second cell as a serving cell of the user equipment. The receiver 740 is configured to receive a second message sent by the second base station or the first base station, and the second message is used to indicate that the serving cell of the user equipment is successfully added. The processor 710 is configured to communicate with the first base station and the second base station by using the first cell and the second cell.

Therefore, according to the user equipment in this embodiment of the present invention, the user equipment obtains first indication information, determines, based on the first indication information, to add a second cell as a serving cell, and sends a first message to a second base station to which the second cell belongs, and the first message is used to request to add the second cell as a serving cell of the user equipment, so that after receiving a second message used to indicate that the serving cell of the user equipment is successfully added, the user equipment can perform data transmission with the first base station and the second base station by using the first cell and the second cell. Therefore, the user equipment can autonomously add a cell as a serving cell, and the base station can be prevented from performing centralized management on the serving cell of the user equipment, so that processing load of the base station can be alleviated, and system signaling overheads can be reduced.

It should be understood that, in this embodiment of the present invention, the processor 710 may be a central processing unit (Central Processing Unit, "CPU" for short), or the processor 710 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any normal processor or the like.

The memory 720 may include a read-only memory and a random access memory, and provide an instruction and data to the processor 710. A part of the memory 720 may further include a nonvolatile random access memory. For example, the memory 720 may further store device type information.

In addition to a data bus, the bus system 730 may include a power bus, a control bus, a status signal bus, and the like. However, for clarity of description, various buses are marked as the bus system 730 in the figure.

In an implementation process, the steps of the foregoing method may be completed by using an integrated logic circuit of hardware in the processor 710 or an instruction in a form of software. The steps of the method disclosed with reference to the embodiments of the present invention may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 720. The processor 710 reads information from the memory 720, and completes the steps of the foregoing method in combination with hardware in the processor 710. To avoid repetition, details are not described herein again.

Optionally, in an embodiment, the first indication information is used to indicate whether adding a serving cell for the user equipment is allowed.

That the processor 710 determines, based on the first indication information, to add a second cell as a serving cell includes:

when the first indication information indicates that adding a serving cell for the user equipment is allowed, determining, by the user equipment, to add the second cell as a serving cell.

Optionally, in an embodiment, the first indication information includes a cell frequency set. That the processor 710 determines, based on the first indication information, to add a second cell as a serving cell specifically includes:

when a frequency of the second cell belongs to the cell frequency set, determining, by the processor 710, to add the second cell as a serving cell.

Optionally, in an embodiment, the first indication information includes a cell frequency and physical cell identifier PCI set. That the processor 710 determines, based on the first indication information, to add a second cell as a serving cell specifically includes:

when a frequency and a PCI of the second cell belong to the cell frequency and PCI set, determining, by the processor 710, to add the second cell as a serving cell.

Optionally, in an embodiment, the receiver 740 is further configured to receive second indication information sent by the second base station, and the second indication information is used to indicate a first cell set.

That the processor 710 determines, based on the first indication information, to add a second cell as a serving cell includes:

when the first cell belongs to the first cell set, determining, by the processor 710, to add the second cell as a serving cell.

Optionally, in an embodiment, the first indication information includes trigger condition information about adding a serving cell.

Optionally, in an embodiment, the receiver 740 is further configured to receive third indication information sent by the second base station, and the third indication information is used to indicate whether the second cell belongs to a licensed-assisted access LAA cell, and/or is used to indicate correlated-cell information of the second cell.

That the processor 710 determines, based on the first indication information, to add a second cell as a serving cell includes:

when it is determined that the second cell belongs to the LAA cell and/or the first cell is a correlated cell of the second cell, determining, by the processor 710 based on the first indication information, to add the second cell as a serving cell.

Optionally, in an embodiment, the first base station and the second base station are a same base station, the first indication information is used to indicate a second cell set, and a cell included in the second cell set is a cell of the first base station.

That the processor 710 determines, based on the first indication information, to add a second cell as a serving cell includes:

when the second cell belongs to the second cell set, determining, by the processor 710, to add the second cell as a serving cell.

Optionally, in an embodiment, the first message includes at least one of the following information: cell identifier information of the first cell, identifier information of the user equipment, or first authentication information used to perform authentication on the user equipment.

Optionally, in an embodiment, the second message includes second authentication information used to perform authentication on a network.

That the processor 710 communicates with the first base station and the second base station by using the first cell and the second cell includes:

after authentication that is based on the second authentication information succeeds, communicating, by the processor 710, with the first base station and the second base station by using the first cell and the second cell.

The user equipment 700 according to this embodiment of the present invention may be corresponding to UE in a communication method according to an embodiment of the present invention and the user equipment 400 according to the embodiment of the present invention, and the foregoing and other operations and/or functions of modules in the user equipment 700 are separately used to implement corresponding procedures of the methods 100 to 300 in FIG. 1 to FIG. 16. For brevity, details are not described herein again.

Therefore, according to the user equipment in this embodiment of the present invention, the user equipment obtains first indication information, determines, based on the first indication information, to add a second cell as a serving cell, and sends a first message to a second base station to which the second cell belongs, and the first message is used to request to add the second cell as a serving cell of the user equipment, so that after receiving a second message used to indicate that the serving cell of the user equipment is successfully added, the user equipment can perform data transmission with the first base station and the second base station by using the first cell and the second cell. Therefore, the user equipment can autonomously add a cell as a serving cell, and the base station can be prevented from performing centralized management on the serving cell of the user equipment, so that processing load of the base station can be alleviated, and system signaling overheads can be reduced.

Figure 21:
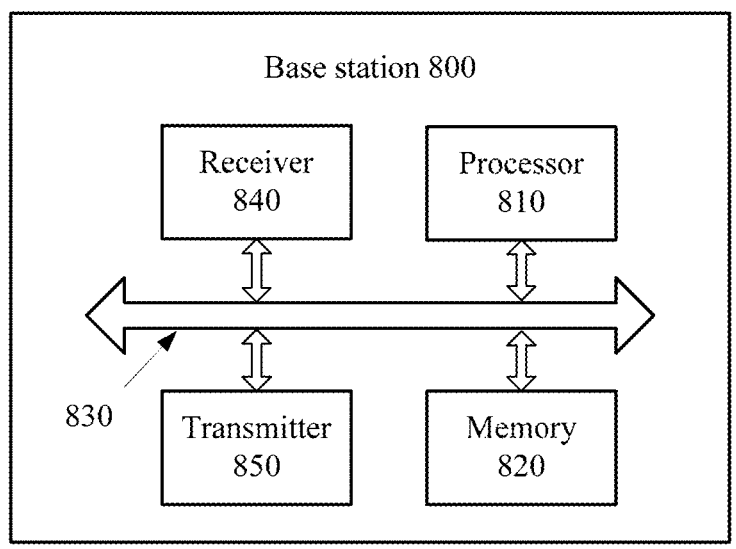
FIG. 21 is another schematic block diagram of a base station according to an embodiment of the present invention.

As shown in FIG. 21, an embodiment of the present invention further provides a base station 800, and the base station 800 includes a processor 810, a memory 820, a bus system 830, a receiver 840, and a transmitter 850. The processor 810, the memory 820, the receiver 840, and the transmitter 850 are connected to each other by using the bus system 830, the memory 820 is configured to store an instruction, and the processor 810 is configured to execute the instruction stored in the memory 820, to control the receiver 840 to receive a signal and control the transmitter 850 to send a signal. The receiver 840 is configured to receive a first message sent by user equipment. The first message is used to request to add a second cell of the base station as a serving cell of the user equipment, the user equipment is in a radio resource control RRC connected mode, a serving base station of the user equipment is a first base station, and a serving cell of the user equipment is a first cell of the first base station. The transmitter 850 is configured to send a second message to the user equipment, and the second message is used to indicate that the serving cell of the user equipment is successfully added. The processor 810 is configured to communicate with the user equipment by using the second cell.

Therefore, according to the base station in this embodiment of the present invention, a second base station receives a first message that is autonomously sent by user equipment and that is used to request to add a second cell of the second base station as a serving cell of the user equipment, and after the serving cell of the user equipment is successfully added, communicates with the user equipment by using the second cell, so that the user equipment can autonomously add a cell as a serving cell, and the base station can be prevented from performing centralized management on the serving cell of the user equipment. Therefore, processing load of the base station can be alleviated, and system signaling overheads can be reduced.

It should be understood that, in this embodiment of the present invention, the processor 810 may be a central processing unit (Central Processing Unit, "CPU" for short), or the processor 810 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any normal processor or the like.

The memory 820 may include a read-only memory and a random access memory, and provide an instruction and data to the processor 810. A part of the memory 820 may further include a nonvolatile random access memory. For example, the memory 820 may further store device type information.

In addition to a data bus, the bus system 830 may include a power bus, a control bus, a status signal bus, and the like. However, for clarity of description, various buses are marked as the bus system 830 in the figure.

In an implementation process, the steps of the foregoing method may be completed by using an integrated logic circuit of hardware in the processor 810 or an instruction in a form of software. The steps of the method disclosed with reference to the embodiments of the present invention may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 820. The processor 810 reads information from the memory 820, and completes the steps of the foregoing method in combination with hardware in the processor 810. To avoid repetition, details are not described herein again.

Optionally, in an embodiment, the transmitter 850 is configured to send a third message to the first base station according to the first message, and the third message is used to request the first base station to add a transmission path for the user equipment.

The receiver 840 is configured to receive a fourth message sent by the first base station according to the third message, and the fourth message is used to indicate that the transmission path of the user equipment is successfully added.

Optionally, in an embodiment, the transmitter 850 is configured to send second indication information to the user equipment, and the second indication information is used to indicate a first cell set.

That the receiver 840 receives a first message sent by user equipment includes:

when the user equipment determines, according to the second indication information, that the first cell belongs to the first cell set, receiving, by the receiver 840, the first message sent by the user equipment.

Optionally, in an embodiment, the transmitter 850 is configured to send third indication information to the user equipment, and the third indication information is used to indicate whether the second cell belongs to a licensed-assisted access LAA cell, and/or is used to indicate correlated-cell information of the second cell.

That the receiver 840 receives a first message sent by user equipment includes:

when the user equipment determines that the second cell belongs to the LAA cell and/or the first cell is a correlated cell of the second cell, receiving, by the receiver 840, the first message sent by the user equipment.

Optionally, in an embodiment, the fourth message includes bearer information of the user equipment. The bearer information of the user equipment includes at least one of the following information: bearer identifier information of the user equipment, bearer quality of service QoS information of the user equipment, or uplink GPRS Tunneling Protocol GTP tunnel address information of the user equipment.

Optionally, in an embodiment, the transmitter 850 is configured to send a fifth message to the first base station, and the fifth message includes downlink GTP tunnel address information of the user equipment.

Optionally, in an embodiment, the fourth message and the second message include second authentication information used to perform authentication on a network.

That the processor 810 communicates with the user equipment by using the second cell specifically includes:

after the user equipment succeeds in authentication that is based on the second authentication information, communicating, by the processor 810, with the user equipment by using the second cell.

Optionally, in an embodiment, the first message includes at least one of the following information: cell identifier information of the first cell, identifier information of the user equipment, or first authentication information used to perform authentication on the user equipment. The third message includes the identifier information of the user equipment and/or the first authentication information.

The base station 800 according to this embodiment of the present invention may be corresponding to a second base station in a communication method according to an embodiment of the present invention and the base station 500 according to the embodiment of the present invention, and the foregoing and other operations and/or functions of modules in the base station 800 are separately used to implement corresponding procedures of the methods 100 to 300 in FIG. 1 to FIG. 16. For brevity, details are not described herein again.

Therefore, according to the base station in this embodiment of the present invention, a second base station receives a first message that is autonomously sent by user equipment and that is used to request to add a second cell of the second base station as a serving cell of the user equipment, and after the serving cell of the user equipment is successfully added, communicates with the user equipment by using the second cell, so that the user equipment can autonomously add a cell as a serving cell, and the base station can be prevented from performing centralized management on the serving cell of the user equipment. Therefore, processing load of the base station can be alleviated, and system signaling overheads can be reduced.

Figure 22:
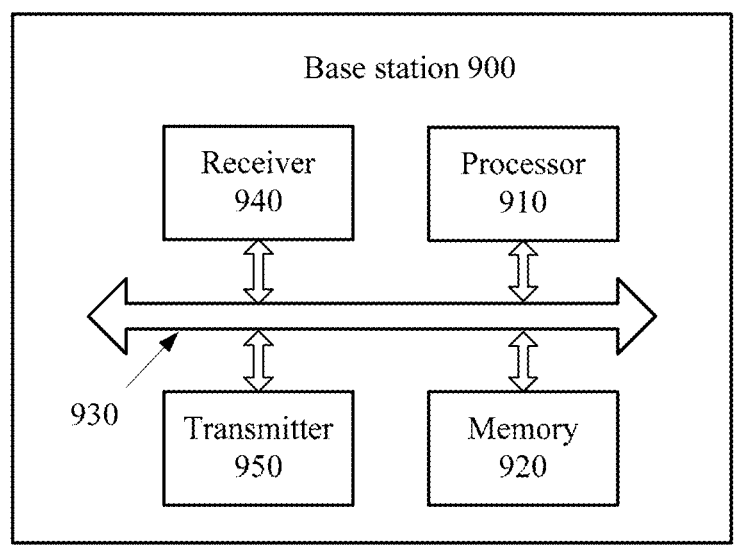
FIG. 22 is another schematic block diagram of a base station according to another embodiment of the present invention.

As shown in FIG. 22, an embodiment of the present invention further provides a base station 900, and the base station 900 includes a processor 910, a memory 920, a bus system 930, a receiver 940, and a transmitter 950. The processor 910, the memory 920, the receiver 940, and the transmitter 950 are connected to each other by using the bus system 930, the memory 920 is configured to store an instruction, and the processor 910 is configured to execute the instruction stored in the memory 920, to control the receiver 940 to receive a signal and control the transmitter 950 to send a signal. The transmitter 950 is configured to send first indication information to user equipment, so that the user equipment determines, according to the first indication information, whether a serving cell can be added. The receiver 940 is configured to: when the user equipment determines, according to the first indication information, to add a serving cell, receive a third message sent by a second base station, where the third message is used to request the base station to add a transmission path for the user equipment, and the third message includes identifier information of the user equipment. The processor 910 is configured to identify the user equipment according to the identifier information of the user equipment when the user equipment is in a radio resource control RRC connected mode, where a serving base station of the user equipment is the first base station, and a serving cell of the user equipment is a first cell of the first base station. The transmitter 950 is configured to send a fourth message to the second base station, and the fourth message is used to indicate that the transmission path of the user equipment is successfully added.

Therefore, according to the base station in this embodiment of the present invention, a first base station sends first indication information to user equipment, so that the user equipment determines, based on the first indication information, whether a serving cell can be autonomously added, and when the user equipment is in an RRC connected mode and determines that the serving cell can be added, requests the first base station and a second base station to add the serving cell for the user equipment. Therefore, the user equipment can autonomously add a cell as a serving cell, and the base station can be prevented from performing centralized management on the serving cell of the user equipment, so that processing load of the base station can be alleviated, and system signaling overheads can be reduced.

It should be understood that, in this embodiment of the present invention, the processor 910 may be a central processing unit (Central Processing Unit, "CPU" for short), or the processor 910 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any normal processor or the like.

The memory 920 may include a read-only memory and a random access memory, and provide an instruction and data to the processor 910. A part of the memory 920 may further include a nonvolatile random access memory. For example, the memory 920 may further store device type information.

In addition to a data bus, the bus system 930 may include a power bus, a control bus, a status signal bus, and the like. However, for clarity of description, various buses are marked as the bus system 930 in the figure.

In an implementation process, the steps of the foregoing method may be completed by using an integrated logic circuit of hardware in the processor 910 or an instruction in a form of software. The steps of the method disclosed with reference to the embodiments of the present invention may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 920. The processor 910 reads information from the memory 920, and completes the steps of the foregoing method in combination with hardware in the processor 910. To avoid repetition, details are not described herein again.

Optionally, in an embodiment, the transmitter 950 is configured to send a second message to the user equipment when the user equipment requests, according to the first indication information, to add a second cell as a serving cell, and the second message is used to indicate that the second cell is successfully added as a serving cell of the user equipment.

Optionally, in an embodiment, the receiver 940 is configured to receive a fifth message sent by the second base station, and the fifth message includes downlink GTP tunnel address information of the user equipment.

Optionally, in an embodiment, the first indication information is used to indicate whether adding a serving cell for the user equipment is allowed; or the first indication information includes a cell frequency set; or the first indication information includes a cell frequency and physical cell identifier PCI set; or the first indication information includes trigger condition information about adding a serving cell.

Optionally, in an embodiment, the fourth message includes bearer information of the user equipment. The bearer information of the user equipment includes at least one of the following information: bearer identifier information of the user equipment, bearer quality of service QoS information of the user equipment, or uplink GPRS Tunneling Protocol GTP tunnel address information of the user equipment.

The base station 900 according to this embodiment of the present invention may be corresponding to a first base station in a communication method according to an embodiment of the present invention and the base station 600 according to the embodiment of the present invention, and the foregoing and other operations and/or functions of modules in the base station 900 are separately used to implement corresponding procedures of the methods 100 to 300 in FIG. 1 to FIG. 16. For brevity, details are not described herein again.

Therefore, according to the base station in this embodiment of the present invention, a first base station sends first indication information to user equipment, so that the user equipment determines, based on the first indication information, whether a serving cell can be autonomously added, and when the user equipment is in an RRC connected mode and determines that the serving cell can be added, requests the first base station and a second base station to add the serving cell for the user equipment. Therefore, the user equipment can autonomously add a cell as a serving cell, and the base station can be prevented from performing centralized management on the serving cell of the user equipment, so that processing load of the base station can be alleviated, and system signaling overheads can be reduced.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
    obtaining, by a user equipment, first indication information, wherein the user equipment determines, according to the first indication information, whether a serving cell can be added;
    receiving, by the user equipment, second indication information sent by a second base station, wherein the second indication information is used to indicate a first cell set;
    when the user equipment is in a radio resource control (RRC) connected mode, determining, by the user equipment based on the first indication information, to add a second cell as a serving cell, wherein a serving base station of the user equipment is a first base station, and a serving cell of the user equipment is a first cell of the first base station;
    sending, by the user equipment, a first message to the second base station to which the second cell belongs, wherein the first message is used to request to add the second cell as a serving cell of the user equipment;
    receiving, by the user equipment, a second message sent by the second base station or the first base station, wherein the second message is used to indicate that the second cell is successfully added as a serving cell of the user equipment; and
    communicating, by the user equipment, with the first base station and the second base station using the first cell and the second cell, and
    wherein the determining, by the user equipment based on the first indication information, to add a second cell as a serving cell comprises: when the first cell belongs to the first cell set, determining, by the user equipment based on the first indication information, to add the second cell as a serving cell.

2. The communication method according to claim 1, wherein the first indication information comprises trigger condition information about adding a serving cell.

3. A communication method, comprising:
    sending, by a second base station, indication information to a user equipment, wherein the indication information is used to indicate a first cell set, wherein the user equipment is in a radio resource control (RRC) connected mode, a serving base station of the user equipment is a first base station, and a serving cell of the user equipment is a first cell of the first base station; and
    receiving, by the second base station, a first message sent by the user equipment in response to the user equipment determining, according to the indication information, that the first cell belongs to the first cell set, wherein the first message is used to request to add a second cell of the second base station as a serving cell of the user equipment;
    sending, by the second base station, a second message to the user equipment, wherein the second message is used to indicate that the second cell is successfully added as a serving cell of the user equipment; and
    communicating, by the second base station, with the user equipment using the second cell.

4. The communication method according to claim 3, wherein the communication method further comprises:
    sending, by the second base station, a third message to the first base station according to the first message, wherein the third message is used to request the first base station to add a transmission path for the user equipment; and
    receiving, by the second base station, a fourth message sent by the first base station according to the third message, wherein the fourth message is used to indicate that the transmission path of the user equipment is successfully added.

5. An apparatus, comprising:
    a receiver configured to obtain first indication information, wherein the apparatus determines, according to the first indication information, whether a serving cell can be added, wherein a serving base station of the apparatus is a first base station, and a serving cell of the apparatus is a first cell of the first base station; wherein the receiver is further configured to receive second indication information sent by a second base station, and the second indication information is used to indicate a first cell set;

a processor configured to: when the apparatus is in a radio resource control (RRC) connected mode and when the first cell belongs to the first cell set, determine, based on the first indication information, to add a second cell as a serving cell;

a transmitter configured to send a first message to the second base station to which the second cell belongs, wherein the first message is used to request to add the second cell as a serving cell of the apparatus;

the receiver is further configured to receive a second message sent by the second base station or the first base station, wherein the second message is used to indicate that the second cell is successfully added as a serving cell of the apparatus; and the processor is further configured to communicate with the first base station and the second base station using the first cell and the second cell.

6. The apparatus according to claim 5, wherein the first indication information comprises trigger condition information about adding a serving cell.

7. A base station, comprising:

a transmitter configured to send indication information to a user equipment, wherein the indication information is used to indicate a first cell set, wherein the user equipment is in a radio resource control (RRC) connected mode, a serving base station of the user equipment is a first base station, and a serving cell of the user equipment is a first cell of the first base station;

a receiver configured to receive a first message sent by the user equipment, in response to the user equipment having determined, according to the indication information, that the first cell belongs to the first cell set, wherein the first message is used to request to add a second cell of the base station as a serving cell of the user equipment;

the transmitter is further configured to send a second message to the user equipment, wherein the second message is used to indicate that the second cell is successfully added as a serving cell of the user equipment; and a processor configured to communicate with the user equipment using the second cell.

8. The base station according to claim 7, wherein the transmitter is further configured to send a third message to the first base station according to the first message, and the third message is used to request the first base station to add a transmission path for the user equipment; and the receiver is further configured to receive a fourth message sent by the first base station according to the third message, wherein the fourth message is used to indicate that the transmission path of the user equipment is successfully added.

* * * * *